(12) United States Patent
Goel et al.

(10) Patent No.: US 8,149,715 B1
(45) Date of Patent: Apr. 3, 2012

(54) MESH NETWORK OPERATIONS

(75) Inventors: Sandesh Goel, Fremont, CA (US);
Ashish Kumar Shukla, Yerwada (IN)

(73) Assignee: Marvell International Ltd., Hamilton (BM)

( * ) Notice: Subject to any disclaimer, the term of this patent is extended or adjusted under 35 U.S.C. 154(b) by 885 days.

(21) Appl. No.: 12/167,841

(22) Filed: Jul. 3, 2008

Related U.S. Application Data

(60) Provisional application No. 60/950,284, filed on Jul. 17, 2007, provisional application No. 60/950,435, filed on Jul. 18, 2007, provisional application No. 60/954,679, filed on Aug. 8, 2007.

(51) Int. Cl.
*H04L 1/00* (2006.01)

(52) U.S. Cl. ......... 370/238; 370/406; 370/256; 370/255

(58) Field of Classification Search .................. 370/406, 370/256, 255
See application file for complete search history.

(56) References Cited

U.S. PATENT DOCUMENTS

| | | | |
|---|---|---|---|
| 7,626,966 B1* | 12/2009 | Ruiter et al. ................. | 370/337 |
| 2002/0025810 A1* | 2/2002 | Takayama et al. ............ | 455/432 |
| 2002/0049854 A1 | 4/2002 | Cox et al. | |
| 2005/0186962 A1* | 8/2005 | Yoneyama et al. ......... | 455/435.2 |
| 2005/0254423 A1 | 11/2005 | Berghoff | |
| 2005/0281278 A1 | 12/2005 | Black et al. | |
| 2006/0007863 A1 | 1/2006 | Naghian | |
| 2006/0268804 A1 | 11/2006 | Kim et al. | |
| 2006/0282667 A1* | 12/2006 | Kim et al. .................... | 713/169 |
| 2007/0010247 A1* | 1/2007 | Mouna-Kingue et al. .... | 455/434 |
| 2007/0178888 A1* | 8/2007 | Alfano et al. ............... | 455/414.1 |
| 2007/0206762 A1 | 9/2007 | Chandra et al. | |
| 2007/0297388 A1 | 12/2007 | Appaji et al. | |
| 2008/0069034 A1* | 3/2008 | Buddhikot et al. ........... | 370/328 |
| 2008/0095058 A1* | 4/2008 | Dalmases et al. ............ | 370/237 |
| 2008/0137580 A1* | 6/2008 | Axelsson et al. ............. | 370/315 |
| 2008/0170550 A1* | 7/2008 | Liu et al. ....................... | 370/338 |
| 2010/0061244 A1 | 3/2010 | Meier et al. | |
| 2010/0238793 A1* | 9/2010 | Alfano et al. ................. | 370/216 |
| 2011/0002226 A1* | 1/2011 | Bhatti ........................... | 370/248 |

OTHER PUBLICATIONS

Haas, Zygmunt J., et al., "Gossip-Based Ad Hoc Routing", *IEEE/ACM Transactions on Networking*, vol. 14, No. 3, (Jun. 2006),pp. 479-491.

"Draft Standard for Information Technology—Telecommunications and information exchange between systems—Local and metropolitan area networks—Specific requirements", *IEEE P802.11s/D1.03*, (Apr. 2007),251 pages.

"Final Office Action", U.S. Appl. No. 12/186,429, (Oct. 13, 2011), 23 pages.

"Non-Final Office Action", U.S. Appl. No. 12/186,429, (Apr. 25, 2011), 19 pages.

* cited by examiner

*Primary Examiner* — Huy Vu
*Assistant Examiner* — Omer Mian

(57) ABSTRACT

Various embodiments provide improved mesh networks with properties that address various shortcomings of current mesh network implementations. At least some embodiments are directed to improving operations of mesh networks in connection with battery powered devices and address concerns associated with latency issues due to power save nodes as well as load balancing. Yet other embodiments address route cache timeouts, reduce route discovery overhead, perform proactive route maintenance based on a node's battery, and provide a straightforward battery-aware process based sleep protocol.

27 Claims, 11 Drawing Sheets

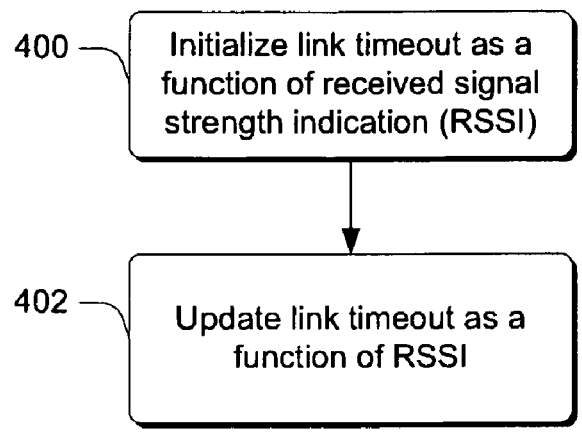
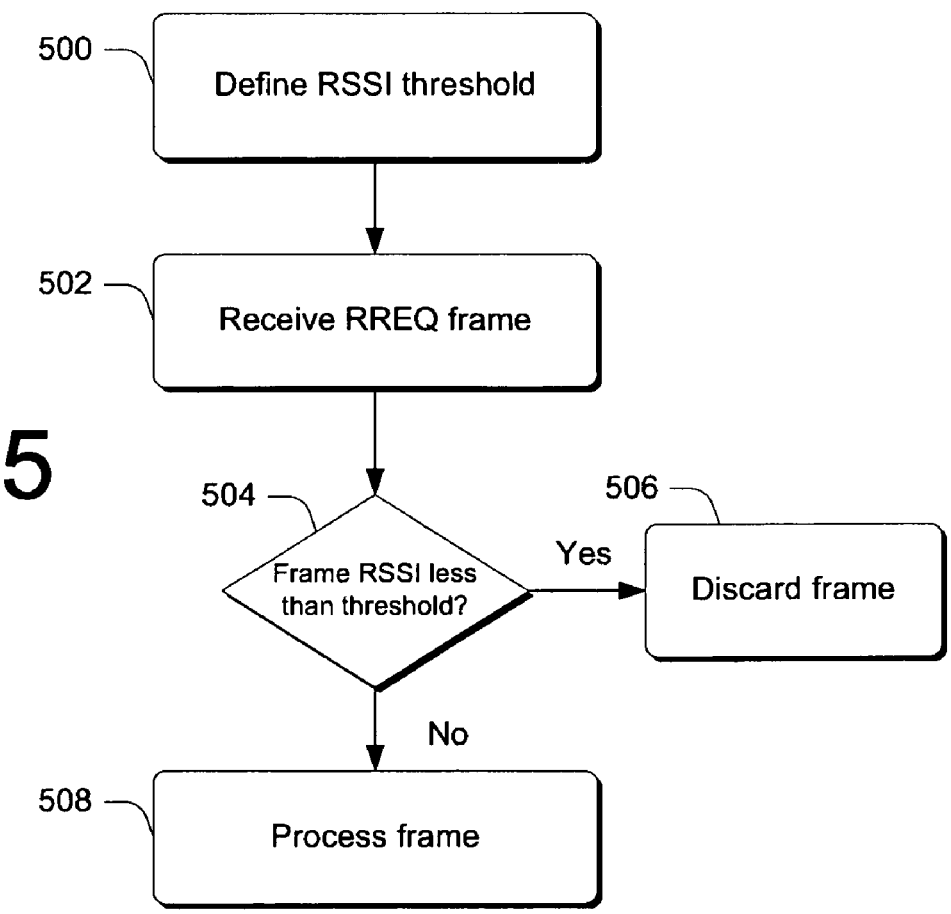

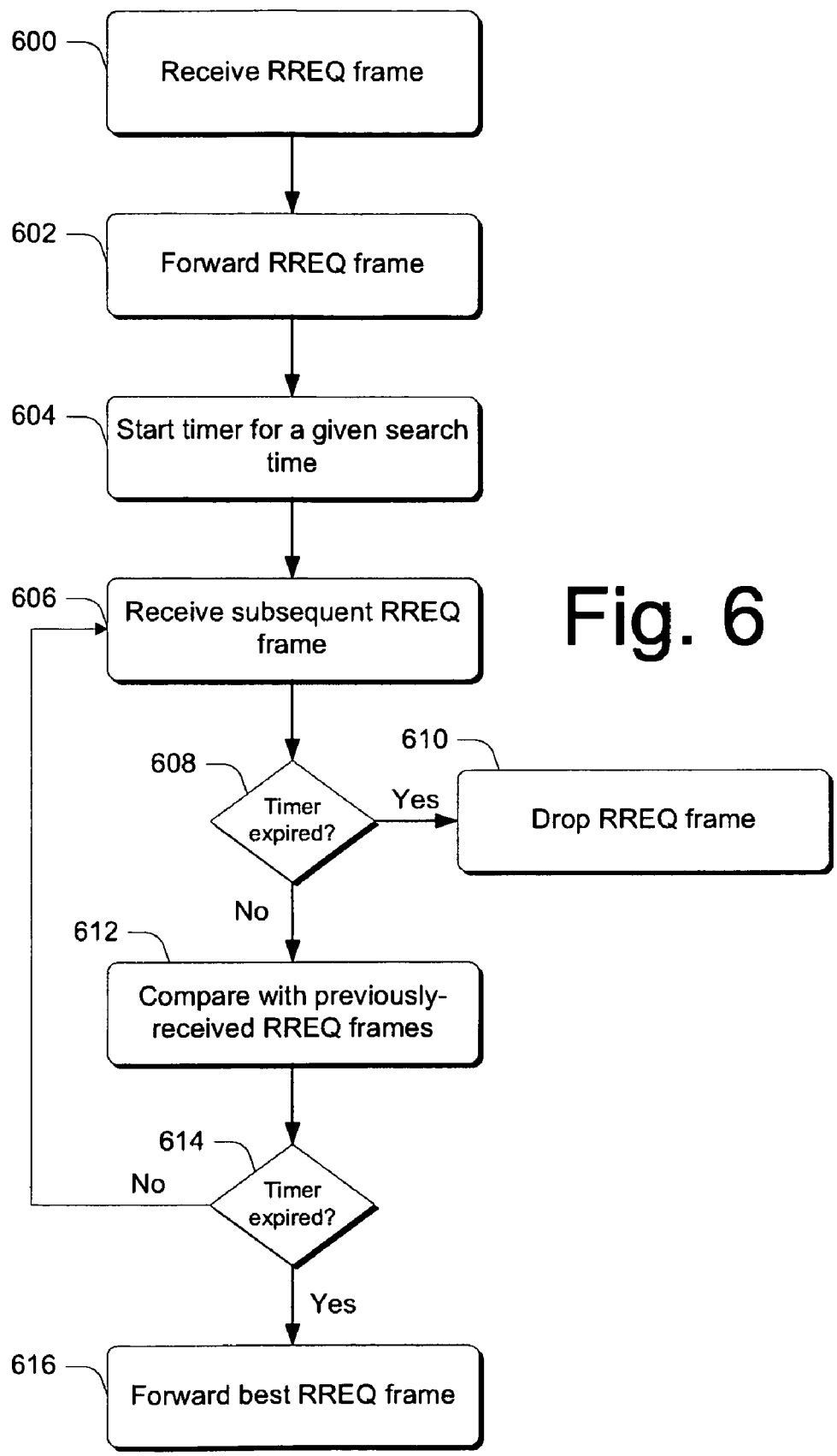

MESH NETWORK OPERATIONS

RELATED APPLICATIONS

This application claims priority to U.S. Provisional Application Ser. Nos. 60/950,284 filed on Jul. 17, 2007, 60/950,435 filed on Jul. 18, 2007 and 60/954,679 filed on Aug. 8, 2007, the disclosures of which are incorporated by reference herein.

BACKGROUND

The IEEE 802.11s specification (IEEE P802.11s™/D1.03, Draft STANDARD for Information Technology—Telecommunications and information exchange between systems-Local and metropolitan area networks-Specific requirements-Part 11: Wireless LAN Medium Access Control (MAC) and Physical Layer (PHY) specifications, Amendment <number>: ESS Mesh Networking) proposes an airtime metric which is concerned with minimizing the total medium usage and uses a current PHY rate to calculate the total time that a packet will be used over the air when going from a source to a destination. This metric is very simple in concept and some in the industry feel that it does not account adequately for battery powered devices, additional latency due to power save nodes, load balancing, and other issues.

In addition, mesh networks that are employed in connection with the IEEE 802.11s standard, and others, still continue to suffer from non-optimal properties that can be improved upon.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a method comprises generating a cost function based on a mesh network node's battery level and signal strength of one or more nodes in a mesh network; and making a mesh network route decision based upon the cost function.

In one or more other embodiments, a method comprises initializing a link timeout in a node of a mesh network as a function of an initially received signal strength indication (RSSI); and updating the link timeout as a function of one or more subsequent RSSIs.

In one or more other embodiments, a method comprises defining a received signal strength indication (RSSI) threshold in a mesh network; receiving a route request (RREQ) frame; ascertaining whether an RSSI associated with the RREQ frame is less than the RSSI threshold; discarding the received RREQ frame if the RREQ frame's RSSI is less than the RSSI threshold; and processing the received RREQ frame if the RREQ frame's RSSI is not less than the RSSI threshold.

In one or more other embodiments, a method comprises defining a battery threshold level for a node of a mesh network; comparing a node's battery level with the battery threshold level; and responsive to the node's battery level being less than the battery threshold level, performing one or more route maintenance actions.

In one or more other embodiments, a method comprises defining a battery threshold level for a node in a mesh network; monitoring a battery level associated with the node; ascertaining whether the node's battery level is greater than the battery threshold level; if the node's battery level is greater than the battery threshold level, operating the node in accordance with underlying protocols; and if the node's battery level is not greater than the battery threshold level, entering a sleep mode with a probability p, where $0<p<1$.

Various embodiments also include systems and means for performing the functionality described above and below.

BRIEF DESCRIPTION OF THE DRAWINGS

The same numbers are used throughout the drawings to reference like features.

FIG. 4 is a flow diagram that describes steps a method in accordance with one or more embodiments.
FIG. 5 is a flow diagram that describes steps a method in accordance with one or more embodiments.
FIG. 6 is a flow diagram that describes steps a method in accordance with one or more embodiments.

DETAILED DESCRIPTION

Overview

Various embodiments provide improved mesh networks with properties that address various shortcomings of current mesh network implementations. At least some embodiments are directed to improving operations of mesh networks in connection with battery powered devices and address concerns associated with latency issues due to power save nodes as well as load balancing. Yet other embodiments address route cache timeouts, reduce route discovery overhead, perform proactive route maintenance based on a node's battery, and provide a straightforward battery-aware process-based sleep protocol.

In the discussion that follows, a section entitled "Operating Environment" is provided and describes one example operating environment in which one or more embodiments can be employed. Following this, a section entitled "Improved Route Metric" is provided and describes various embodiments directed to improving route metrics, addressing the latency issues, and performing load balancing. Following this, a section entitled "Route Cache Timeout in Mesh Networks" is provided and describes embodiments directed to improving route cache timeout operations. Following this, a section entitled "Reducing Route Discovery Overhead" describes embodiments directed to reducing the overhead associated with route discovery in mesh networks. Next, a section entitled "Proactive Route Maintenance Based on Node's Battery" is provided and describes embodiments associated with improving route maintenance. Following this, a section entitled "Battery Aware Gossip Based Sleep Protocol" is provided and describes embodiments associated with providing a battery aware gossip based sleep protocol. Finally, a section entitled "Example Node Environments" is provided and describes example devices that can serve as nodes in a mesh network.

Operating Environment

Mesh networking provides a way to route data, voice and instructions between various so-called nodes. One standard that describes and defines operations within a mesh network is the IEEE 802.11s standard. In at least some embodiments, the various described nodes and methodology employed by the nodes are compliant with the IEEE 802.11s standard.

A mesh network is typically implemented over a wireless network system, such as a wireless LAN. By using mesh networking, continuous connections between nodes can be made and reconfigured connections can be formed around broken paths. Such is typically done by hopping from node to node until a destination node is reached. Mesh networks are said to be "self-healing" insofar as their ability to operate in the presence of nodes whose connections or paths have disappeared.

Figure 1:
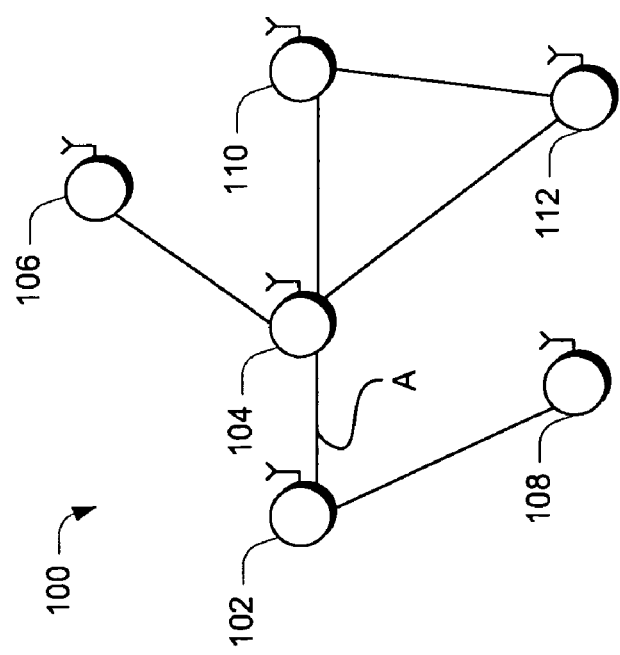
FIG. 1 illustrates an example mesh network.

FIG. 1 illustrates an example mesh network generally at 100. In this example, mesh network 100 includes a plurality of nodes 102, 104, 106, 108, 110, and 112. In a mesh network, a node only needs to transmit as far as the next node. Nodes act as repeaters to transmit data from nearby nodes to peers that are too far away to reach thus resulting in a network that can span large distances, especially over rough or difficult terrain. Mesh networks are very reliable, as each node can be connected to several other nodes. If one node drops out of the network due to hardware failure or any other reason, its neighbors simply find another route.

In mesh networks, a node can be provided by fixed and/or mobile devices. Various examples of fixed and/or mobile devices are provided below in the section entitled "Example Node Environments". Typically, however, a node can be any type of device that has a network transceiver. These include a USB hard disk, a telephone, and various types of vehicles such as cars and even airplanes to name just a few.

In the FIG. 1 example, individual nodes are connected via a communication path between the nodes. For example, nodes 102 and 104 are connected via a path designated at "A". Other similar paths exist between the other nodes.

Having considered an example mesh network and various nodes that can make up the network, consider now a discussion of an improved route metric that is directed to improving the efficiency with which communication is conducted within the mesh network.

Improved Route Metric

One purpose of a route metric is to allow mesh nodes to choose the best route that packets should take. The route metric is used to capture the cost of using a path. When multiple paths are present, the path with the least cost is typically chosen. The cost of a path, in turn, is the sum of the costs of the individual links on that path. The cost of a link depends on which parameters in the system are used for optimization purposes.

End-to-end latency is an important parameter of concern for any mesh network. Typically, simply minimizing the hop count will minimize the end-to-end latency. Since many nodes in mesh implementations can be battery powered, it is desirable to try to reduce the energy consumption of the nodes involved, without adversely affecting the end-to-end latency.

In one or more embodiments, parameters of interest that affect the cost of using a link are as follows:

Signal strength—The signal strength over a link determines the physical rate that can be sustained over that link. Higher signal strength means higher rates, which means shorter transmission times. Shorter transmission times mean both lower energy consumption as well as lower latency. Signal strength over a link can be inferred from the Received Signal Strength Indication (RSSI) in the packets received over that link.

Battery level—There is a preference for paths which have nodes with a higher battery level to maximize the life of the mesh.

In one or more embodiments, the cost of a link should be inversely proportional to one or both of the RSSI and the battery level. There are multiple ways to capture this relationship mathematically. For example, the notion that a variable X is inversely proportional to another variable Y, can be expressed in the following ways:

$$X = a - (b*Y) \quad (1)$$

$$X = a/(b*Y) \quad (2)$$

$$X = a/(b*Y*Y) \quad (3)$$

where "a", "b" are constants.

While qualitatively, all of these formulae indicate that X decreases as Y increases and vice versa, they differ in quantitatively how much a change in Y affects a change in X. Specifically, if formula (1) is used, then a specific amount of change in X always causes the same amount of change in Y regardless of the current value of X, e.g., when X decreases by 5, Y will increase by the same amount regardless of the current value of X. However, if formula (2) is used, then the same amount of change in X causes a different amount of change in Y depending on the current value of X. Specifically, the lower the value of X, the larger the change in Y for the same change in X. Formula (3) behaves similar to formula (2), except that the disproportionate change effect is more pronounced.

This can be mathematically explained by applying the differentiation operator on each of the formulas above to provide the following, where formula (1) above corresponds to formula (1) below and so on:

$$dY/dX = -b \quad (1)$$

$$dY/dX = -a/(b*Y*Y) \quad (2)$$

$$dY/dX = -2a/(b*Y*Y*Y) \quad (3)$$

These relationships should be kept in mind when choosing the appropriate mathematical relationship to determine cost from the parameters of interest, as described below.

Battery-Based and/or Signal-to-Noise Ratio-Based Metric

In various embodiments, a battery-based metric can be used to ascertain whether a node should be avoided in a mesh network. Alternately or additionally, a signal-to-noise ratio-based metric can be employed to ascertain whether a node should be avoided in the mesh network. The discussion below presents a metric which combines both the battery-based and the signal-to-noise ratio-based approaches. It is to be appreciated and understood, however, that either approach can be used by itself. That said, consider now a derivation of a cost function in accordance with one or more embodiments.

Given the battery levels of two nodes, one would normally prefer to use the node with the higher battery level. However, this decision is much more important when the battery levels in question are very low. For example, if the two nodes have battery levels of 100% and 80%, then one would prefer to use the node with the 100% battery level. Similarly, if the nodes in question have battery levels of 30% and 10%, the preference would be to use the node with the 30% battery level since the node with the 10% battery level may expire much sooner.

In view of this, a formula can be employed which would help to avoid nodes with marginal battery levels. This reasoning suggests that using formula (2) above is preferable over using formula (1). Given this, using a cost function for battery level having the following form would provide a property such that the increasing cost is higher as the battery life becomes smaller:

$$Cost = b/BatteryLife,$$

where "b" is a constant. Furthermore, using a cost function having the following form would also have the same property, except that the proportional increase in cost as the battery life becomes smaller is even more extreme:

$$Cost = b/BatteryLife^n$$

where n is an integer greater than 1. This property enforces a policy of making it even more unlikely to use nodes with very low battery levels.

Similarly, given the signal strength over two links, one would normally prefer to use a link with a higher signal strength. That is, a link with marginal signal strength is much more likely to drop out than one with a reasonably strong signal strength. For this reason, one would like to give a disproportionately higher cost to links with marginal signal strength. Again, this relationship is captured well by formula (2). Given this, using a cost function for signal strength having the following form would provide a property such that the increasing cost is higher as the signal strength becomes smaller:

$$Cost = a/SNR$$

where "a" is a constant and SNR is the signal-to-noise ratio. This approach enforces a policy of making it even more unlikely to use hops which have a very low SNR.

As noted above, these two cost functions or ones that are similar can be used independently of one another. Alternately or additionally, the cost functions can be combined so that node-based routing decisions can be made as a function of not only a node's battery level, but as a function of the node's SNR level as well.

Based on this, and generalizing the above discussion, the following formula can be used for assessing the cost of a link in accordance with one or more embodiments:

$$Cost = a/S + b/B,$$

where S is the normalized signal strength for a link in the range from between 1 to 100, and B is the normalized battery level at the source node in the range from between 1 to 100 and "a" and "b" are constants.

Using this combined approach, note that the values of "a" and "b" determine the relative weight given to the two parameters in the cost determination. If a>b, then signal strength is given more importance, while if b>a, then battery life is given more importance. In one or more embodiments, suggested default values of "a" and "b" are 1000 each. This implies that the cost can vary from 20 (when both S and B are 100) to 2000 (when both S and B are 1).

Finally, the cost of a particular path is simply the sum of the costs of all the constituent links, which takes into account the hop count for each path. The path with the least cost can then be chosen by the routing algorithm.

With respect to a node's signal strength as described above, consider the following. In one or more embodiments, a receiving node can extract the signal strength from the packets it receives, as will be appreciated by the skilled artisan. For every received packet, access to following parameters is available:
Noise floor
RSSI
SNR Noise floor and RSSI are the values of actual observed noise and signal strength during the reception of a packet in units of dBm. SNR is simply the difference of RSSI and Noise floor and is what typically determines the quality of reception. A low SNR implies a poor link which, in turn, means low PHY rate and throughput, while a high SNR implies a good link and subsequently high PHY rate and throughput. Also, it is worth noting that when SNR is more than what is required to reliably sustain the highest PHY rate, then a yet higher SNR does not provide any benefit in terms of sustainable throughput.

In one or more embodiments, the reasonable dynamic range for SNR is 1-30 dB. For the purpose of metric computation this is normalized to a percentage value between 1 and 100. The receiver does not necessarily rely on only the single snapshot of SNR received in the route request (RREQ) packet. The receiver can keep track of an exponentially averaged SNR for all the nodes (on a per node basis) from which it receives transmissions (e.g., from their beacons, probe responses, etc) and use this average to calculate the cost when desired. This can ensure the route computation against sporadic variations in SNR reporting. Note also that reciprocity is not (and should not be) assumed when computing the signal strength for use in the metric. This is because it is possible that the link is asymmetric and that the quality varies from one direction to the other.

With respect to a node's battery level as described above, consider the following. In one or more embodiments, a node's current battery level can be expressed as four discrete levels. For the purpose of metric computation, this is normalized to a percentage value between 1 and 100. As but one example, the following mapping can be used:

| Battery Level | Battery Percentage |
| --- | --- |
| 0 | 25 |
| 1 | 50 |
| 2 | 75 |
| 3 | 100 |

Note here that even though each battery level really corresponds to a range of battery percentage, it is assigned a unique value for the purpose of metric computation. Based on experience with the battery, this mapping can be revised (e.g. if the battery drain is nonlinear).

Figure 2:
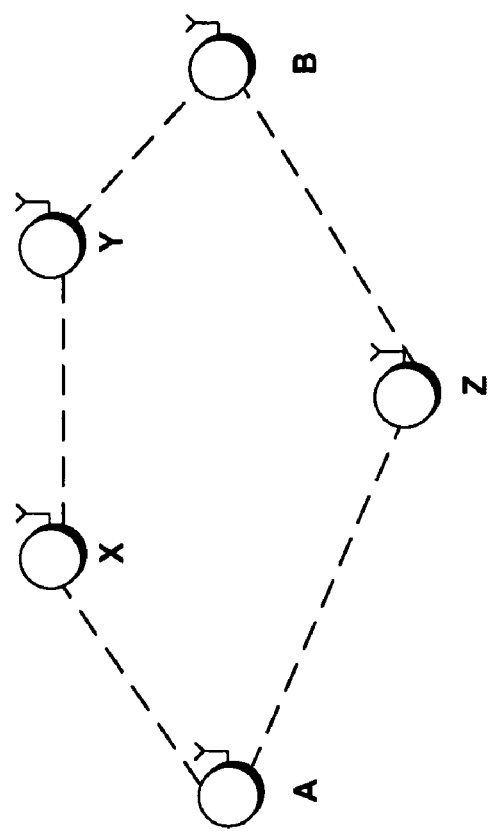
FIG. 2 illustrates an example mesh network.

As an example, consider the following in connection with FIG. 2. Consider the following mesh with two routes from node A to node B. Assume that the battery levels at the nodes are as follows:
A: 3=>100%
X: 2=>75%
Y: 2=>75%
Z: 2=>75%
B: 3=>100%
Also, assume the SNR for each link is as follows:
AX: 25 dB=>83%
XY: 30 dB=>100%
YB: 25 dB=>83%
AZ: 20 dB=>67%
ZB: 20 dB=>67%
In this case, the cost of AZB path=(1000/67+1000/75)+(1000/67+1000/100)=53, and the cost of AXYB path=(1000/83+1000/75)+(1000/100+1000/75)+(1000/83+1000/100)=70. Since the cost of AZB path is lower, it is chosen.

Let's now assume that the battery level of node Z goes down to 0 (i.e. 25%) some time later. If everything else stays unchanged, then the revised cost of route AZB will become 80 and AXYB will now become the lower cost preferred path. This illustrates the importance of refreshing the routes in the dynamic mesh environment.

In one or more embodiments, a node can implement local policy decisions which affect the outcome of route discovery. For example, a node may have a policy to disallow any routes through it when its battery level goes below a certain threshold. In that case, it can simply choose to not forward any RREQ frames that it receives. Alternately or additionally, if a node is plugged into AC power, it may choose to override the current battery level since it is likely that the battery will soon be completely recharged.

In addition to the parameters considered in the metric discussed above, in one or more embodiments, there can be other factors which may be considered in the metric computation to improve the overall mesh network performance. These are each discussed under their own separate heading below.

Nodes in Power Save Mode

When a forwarding node is in a power save state, any traffic going through that node may experience additional delays. This may increase the end-to-end latency for the path that goes through this node. Therefore, any traffic which is latency sensitive will want to avoid, where possible, going through nodes which may enter power save. Specifically, when a node is in a power save state, a special protocol is used to communicate because other nodes which wish to communicate with the power save node have to wait for it to wake up. That is, there is a special handshake for traffic that is sent to a power save node, as will be appreciated by the skilled artisan. This handshake incurs an overhead which leads to an added latency for traffic sent through that node.

Accordingly, for latency-sensitive traffic, one should be sensitive to the number of nodes that are in a power save state which lie on a particular path. For example, some or all of the nodes in a particular path may be in a power save state but otherwise appear to have a low cost function as computed above. An alternate path may not have as good a cost function as computed above, but the nodes in this path are not in a power save state. In this case, a better path choice might be the path defined by the nodes that are not in the power save state.

In one or more embodiments, nodes in a mesh network which may enter a power save state can indicate this by increasing the cost function of the routes in which they are included. In at least some embodiments, this can be done only in cases where a route requester cares about the end-to-end latency. That is, a route requester can indicate a care about end-to-end latency. Responsive to ascertaining that a route requester cares about end-to-end latency, a node can factor this into its computation of its cost function.

In one or more embodiments, the route request (RREQ) includes a bit which can be set to indicate whether a particular route requester cares about end-to-end latency. When a node receives the route request with this particular bit set, it can incorporate its power save behavior in the cost function calculation. This can be performed in any suitable way. As an example, consider the following.

When a node receives a route request, it first updates the cost function in accordance with any of the embodiments described above. Next, the node can check to ascertain whether the latency-sensitive bit is set. If the latency sensitive bit is set and the node is in a power save state, then it can add an additional amount, e.g., 2000, to the cost function. Note that by making this additional cost much larger than the cost normally added for any hop, one can ensure that this is taken into account in the final decision. Since the destination node chooses the route with the least cost, it will typically end up choosing the route with the least number of nodes in the power save state.

Specifically, consider the following. If node A wishes to reach node B, then node A generates and sends a route request (RREQ) which is broadcast to other nodes indicating that it wishes to reach node B. The route request can include a tree which has the total cost for that route which is initialized to 0. Each of the nodes that receives the route request updates the cost tree using cost function calculations as described above and forwards the route request to other nodes in a path. When node B ultimately receives the route request, it will select the route with the lowest cost. Node B then sends this information to node A in the form of a route reply (RREP). Each of the nodes along the way knows whether it is in power save state or not, so it can calculate an associated cost which is factored into the decision to select a particular route.

Load Balancing

In one or more embodiments, individual nodes can participate in load balancing computations to facilitate route selection. Consider a situation in which there are two possible routes between source and destination nodes. Assume that these routes are identical in all respects except for the fact that a node in one of the routes is seeing a lot more traffic than any node in the other route. The performance of the mesh network in this case would be better if the less busy route is selected.

In one or more embodiments, in order to accomplish this, each node maintains a parameter associated with an available medium time. The available medium time is defined as the time when the node is neither receiving nor transmitting data. Note that in at least some embodiments, the time spent receiving data destined to other nodes should be excluded from the available medium time. Within any route, the node with the least available medium time determines the maximum traffic that can flow through that route. Therefore, between two similar routes, one should choose the route with higher least available medium time. The least available medium time can be carried in the route request (RREQ) and can be updated by a forwarding node if its available medium time is lower than the value in the route request that it receives.

As an example implementation, consider the following. Each node can maintain a medium availability as a percentage. This means that each node monitors its medium availability. This can be averaged over some reasonable window (e.g., 1-second windows) and can be updated over time. For example, 1-second windows can be used and exponentially averaged over time. Every node can have this measure of medium availability, and the route request can have an additional field carrying the "minimum medium availability" or MMA. Each node forwarding the route request can update this additional field if its medium availability is lower than what is in the received route request. The destination node can include the MMA in its final route decision.

The final route decision can be based on a number of heuristics. For example, the destination node could add 1/MMA to the final cost of a particular route. Alternately or additionally, if the cost for two routes is similar, the destination node could use the route with the higher MMA. Alternately or additionally, the destination node could use a threshold such that if the MMA is lower than a particular threshold value, the destination node could use a different route if possible. Thresholds can be set using any suitable method which will be appreciated and understood by the skilled artisan. Alternately or additionally, a variation could be to use an average medium availability instead of a minimum medium availability.

Using the above-described metrics, routing decisions can be made that factor into the decision parameters such as link robustness, battery life, latency and/or load balancing. Implementing the above-described approaches can be done by incorporating additional fields into a route request. For example, a latency sensitive flag can be added to the route request and can occupy an additional bit. Furthermore, medium availability, such as the minimum medium availability (MMA) can be included in a field and can occupy eight bits. Destination nodes can then make final route decisions based upon the cumulative cost of a particular route.

Figure 3:
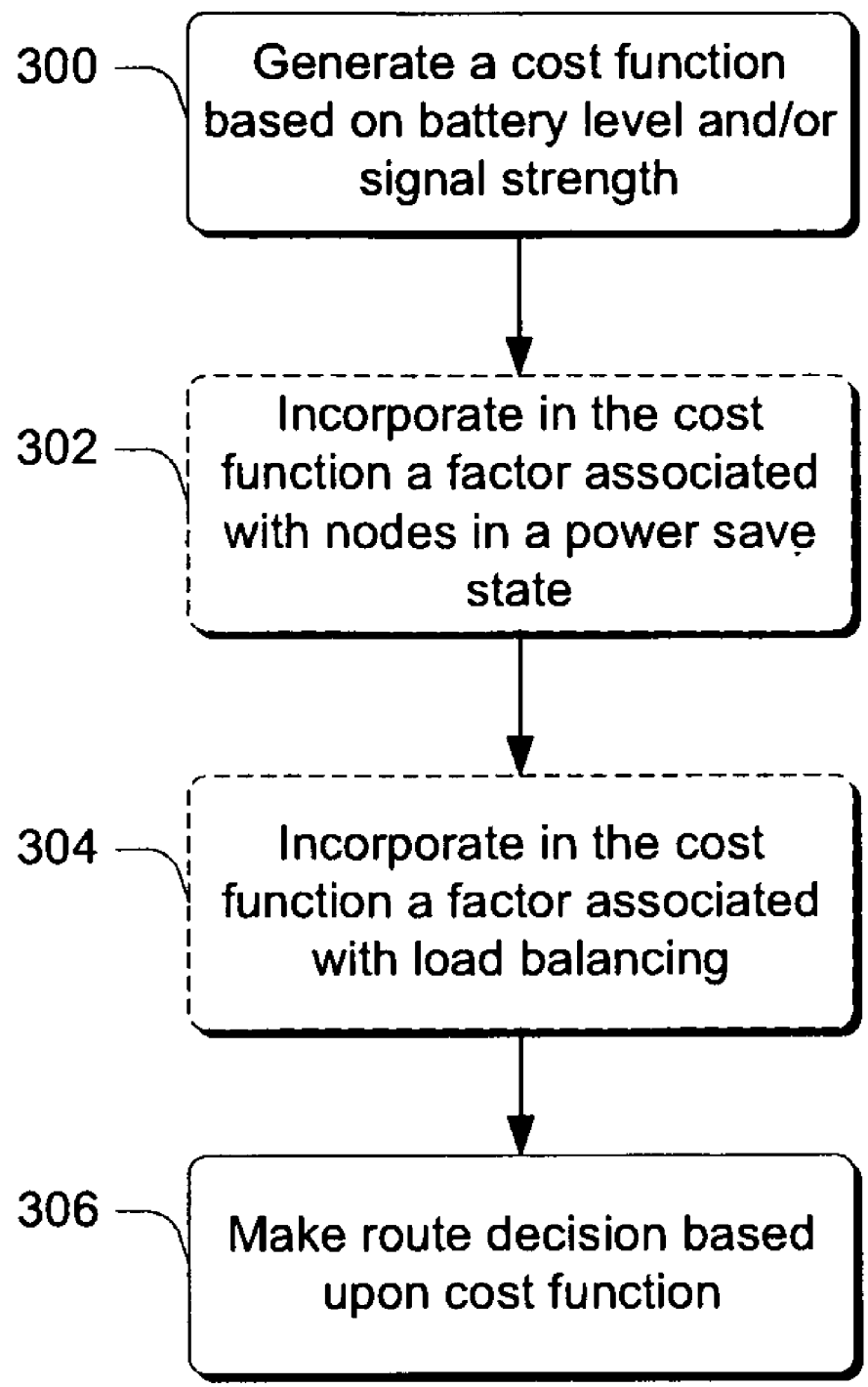
FIG. 3 is a flow diagram that describes steps a method in accordance with one or more embodiments.

FIG. 3 is a flow diagram that describes steps a method in accordance with one or more embodiments. The method can be implemented in connection with any suitable hardware, software, firmware, or combination thereof. In at least some embodiments, the method can be implemented in connection with a mesh network that is compliant with the IEEE 802.11s standard. It is to be appreciated and understood, however, that the method can be implemented in connection with any suitable specification.

Step 300 generates a cost function based on battery level and/or signal strength of one or more nodes in a mesh network. This step can be implemented in any suitable way. For example, in at least some embodiments, individual nodes in the mesh network can generate a cost function that incorporates their own battery level and/or signal strength as described above. In at least some embodiments, the generated cost function can be included in a route request (RREQ) that is forwarded to other nodes.

Step 302 incorporates in the cost function a factor associated with nodes in a power save state. Examples of how this can be done are provided above. Step 304 incorporates into the cost function a factor associated with load balancing. Examples of how this can be done are provided above. Step 306 makes a route decision based upon the cost function. This step can be implemented in any suitable way. For example, in at least some embodiments, when a destination node receives a route request that incorporates the above-mentioned cost function, the destination node can select a route based upon the cost function. In at least some embodiments, selection of the particular route can be articulated to a source node via a route reply (RREP).

Route Cache Timeout in Mesh Networks

As noted above, wireless mesh networks use on-demand, multi-hop routing for data transfer from one node to another. Routes are established dynamically and routing information is stored in a node's local memory for future reuse. This memory, which holds learned routes, is termed a route cache or forwarding table. Individual entries in such a table store a route for a given destination and associated properties including cost and link timeout. An optimal value of a link timeout ensures that entries are expunged from the route cache when such links do not physically exist. Therefore, link timeouts play an important role in routing protocol performance. For example, small timeouts can lead to frequent route discoveries leading to a waste of network resources. On the other hand, large timeouts can render entries stale over a period of time therefore causing route failures which, again, wastes network resources due to retries and routing protocol reactions.

An optimal value of a route timeout can greatly improve performance of mesh routing and can also increase the capacity and life of mesh networks. In the following discussion, the term "route cache", "forwarding table", and "route table" all refer to the same entity, hereinafter referred to as a "route cache". The timeout$_k$ associated with a 1-hop link (i, j) connecting node i and node j at time k is the remaining lifetime of a link (i, j) before it can be considered as expired and subsequently removed from the route cache.

In the past, a fixed timeout was assigned for each link and remained constant. All links were treated as the same and assigned the same timeout when inserted into a route cache.

In one or more embodiments, path loss and RSSI information is used to predict route cache timeouts. When a route is learned, it is classified based upon the received RSSI value and a timeout is assigned depending on the relative strength of the RSSI. In at least some embodiments, higher timeouts are assigned to those links that have relatively large RSSI values. Links with low RSSI values are assigned lower timeout values. In accordance with one or more embodiments, when a packet is received over link (i, j), its associated timeout is updated. In accordance with at least some embodiments, in order to mitigate channel fading and other transient interference, moving exponential RSSI values can be used. The reason for assigning timeout values as described above is as follows. Assume that there are two nodes A and B and that node A is transmitting packets to node B. If the nodes are very close to each other, then all of the packets or frames that are received by node B will have a relatively high RSSI, whereas if the nodes are far away from one another, then the RSSI values for the associated packets or frames will be quite low. If the nodes are far away from each other then, due to mobility or other interference, the nodes may not be able to hear each other. In these instances it is desirable to assign a lower link timeout because the link stability is lower. Alternately, if the nodes are close to one another, then it is desirable to assign them a higher link timeout because the link stability is higher. As will be appreciated by the skilled artisan, path loss and RSSI information is readily available within the mesh network.

In at least some embodiments, and to avoid so-called RSSI reciprocity problems, received RSSI values can be reported in the route reply (RREP) during route discovery and subsequently used as described below. As will be appreciated by the skilled artisan, RSSI reciprocity pertains to a situation in which a link from node A to node B may have a different RSSI value than the link from node B to node A. In addition, in at least some embodiments, timeouts can be updated on a continuous basis after each and every frame exchange. This constitutes an improvement over the previously employed method which assigns a fixed timeout to each node. In these embodiments, received RSSI values can be reported in a data frame's unutilized or reserved mesh header field.

In accordance with one or more embodiments, computation of route cache timeouts utilizes a plurality of configurable parameters that are employed in timeout expressions described below. In this particular example, the following configurable parameters are utilized:

| Parameter | Description |
| --- | --- |
| RSSI_THRSH1 | Lower RSSI threshold |
| RSSI_THRSH2 | Upper RSSI threshold |
| LOW_TIMEOUT | A very low value of timeout in ms (e.g. 0) |
| AVG_TIMEOUT | An average value of timeout in ms (e.g. >0) |
| HIGH_TIMEOUT | A large value of timeout in ms |
| TIMEOUT_INCR | Factor by which link timeout is increased. |
| TIMEOUT_DECR | Factor by which link timeout is decreased. |

It is to be appreciated and understood that threshold values for the RSSI depend on the particular chip being employed. In practice, the low RSSI value should be very close to a minimum possible observed RSSI value, and the upper value should be very close to a value beyond which the signal strength value does not achieve any meaningful marginal increase in result. Additionally, in practice for a given mesh topology, these parameters can be configured and then fixed. As will be appreciated by the skilled artisan, the low, average, and high timeout values can be calculated based on data that is captured relative to the mesh network.

In addition, the following relationships hold among these parameters:

RSSI_THRSH1<RSSI_THRSH2
LOW_TIMEOUT<AVG_TIMEOUT<HIGH_TIMEOUT

In the following discussion, two timeout operations are performed. First, a link timeout initialization process is described. Following this, a timeout operation for defining a new timeout is described based on tracking path loss and RSSI information.

Link Timeout Initialization

In accordance with one or more embodiments, when a link $(i, j)$ is learned, its timeout in a route cache is initialized as follows:

$$timeout_{(i,j)} = \begin{cases} \text{LOW\_TIMEOUT; if } RSSI_{(i,j)} \leq \text{RSSI\_THRSH1} \\ \text{AVG\_TIMEOUT; if RSSI\_THRSH1} < RSSI_{(i,j)} \leq \text{RSSI\_THRSH2} \\ \text{HIGH\_TIMEOUT; if } RSSI_{(i,j)} > \text{RSSI\_THRSH2} \end{cases}$$

According to this formula, if the RSSI value for a particular link is less than the low threshold value, it should be assigned a low timeout value. If the RSSI value for a particular link is higher than the low threshold value but less than or equal to the high threshold value, it should be assigned an average timeout value. Additionally, if the RSSI value is greater than the high threshold value, it should be assigned a high timeout value.

After initialization using the above-described formula, the link timeout can be updated whenever a frame is received over link $(i, j)$. The link timeout can be updated using any suitable formula or approach. For example, timeout updates can be calculated using the above-described formula. Alternately or additionally, a new timeout value can be computed based on tracking path loss and RSSI information. As but one example of how this can be done, consider the formula shown just below:

$$timeout_{(i,j)new} = \begin{cases} \text{LOW\_TIMEOUT; if } RSSI_{(i,j)new} \leq RSSI\_THRSH1 & (1) \\ \min(\text{HIGH\_TIMEOUT}, timeout_{(i,j)old} \otimes \text{TIMEOUT\_INCR}); \\ \quad \text{if RSSI\_THRSH1} < RSSI_{(i,j)new} | \\ \quad RSSI_{(i,j)new} \geq RSSI_{(i,j)old} & (2) \\ \max(\text{AVG\_TIMEOUT}, timeout_{(i,j)old} \oplus \text{TIMEOUT\_DECR}); \\ \quad \text{if RSSI\_THRSH1} < RSSI_{(i,j)new} | \\ \quad RSSI_{(i,j)new} < RSSI_{(i,j)old} & (3) \end{cases}$$

In the above expression, the operator $\otimes$ can represent either an addition or a multiplication operation. The operator $\oplus$ can represent either a subtraction or a division operation.

In the above-described formula, there are three expressions—(1), (2) and (3). In expression (1), a low timeout value is assigned if the new RSSI is less than or equal to the low threshold value RSSI_THRSH1.

Expression (2) is used if the new RSSI value is greater than the low threshold value RSSI_THRSH1 and the new RSSI value is greater than or equal to the old RSSI value. In this case, the new timeout value is given by the minimum of either (1) the high timeout value or (2) the old timeout value operated upon by the illustrated operator and the timeout increment. The illustrated operator can be either an addition operator or a multiplication operator. Note that in this embodiment, the timeout increment parameter is configurable. For example, this parameter can be configured based on the hardware as well as the distribution of the signal. There are multiple considerations that can be taken into account to configure or reconfigure the timeout increment parameter. For example, if there is a mesh network where node mobility is high, then the timeout increment parameter should be a smaller value. On the other hand, if the mesh topology remains static for most of the time, the timeout increment parameter should be a larger value.

Expression (3) is used if the new RSSI value is greater than the low threshold value RSSI_THRSH1 and the new RSSI value is less than the old RSSI value. Additionally, the timeout decrement parameter is configurable as well. If the specified condition is met, then the new timeout is given as the maximum of either (1) the average timeout value or (2) the old timeout value operated upon by the specified operator and the timeout decrement. In this instance, the specified operator can be either a subtraction operation or a division operation.

In this particular embodiment, a moving exponential average of the RSSI per link for each route cache entry is maintained. Further, in at least some embodiments, the illustrated operators can be combined into a single operator either additive (TIMEOUT_INCR >0 for increment, <0 for decrement) or multiplicative (TIMEOUT_INCR >1 for increment or <1 and >0 for decrement).

The above-described approach is useful for a number of reasons. For example, the above-described approach utilizes a lower number of control packet transmissions. For example, if a link timeout is detected, then the mesh network typically has to reply with transmissions. From the routing point of view, if one is not able to predict the timeouts and if a node tries to use a node that does not exist, it will responsively attempt to do a number of retransmissions. These effects can be mitigated using the above-described approach.

In addition, because there is a lower number of control packet transmissions, power consumption is reduced. Furthermore, a lower number of control packet transmissions translates to reduced network traffic which also reduces packet collisions. Furthermore, there will be a reduced average delay by avoiding unnecessary route discoveries as will be appreciated by the skilled artisan.

In addition, network bandwidth and power consumption can be conserved by reducing the cost of link failure during frame forwarding. Moreover, the above-described approach is especially useful in mesh networks where the degree of node mobility is very high. Further, node mobility is captured as nodes coming close to each other observe increasing RSSI values, whereas nodes moving away from each other observe decreasing RSSI values. In addition, utilizing a moving exponential average of RSSI values mitigates channel fading and other transient interferences. Additionally, when there is a stream of frames, for example, voice or video traffic, continuous updates of timeouts maintain link and connectivities and handle link failures before they are detected by the link-layer/MAC acknowledgments as will be appreciated by the skilled artisan.

Thus, by predicting the link cache timeout, mesh routing can be improved.

FIG. 4 illustrates a flow diagram that describes a method in accordance with one or more embodiments. The method can be implemented in connection with any suitable hardware, software, firmware, or combination thereof. In at least some embodiments, the method can be implemented by one or more nodes comprising part of a mesh network.

Step 400 initializes a link timeout as a function of received signal strength indication (RSSI). Examples of how this can be done are provided above. For example, in at least some embodiments, configurable threshold parameters can be defined and used in connection with received signal strength indications (RSSI). In the above-described example, three different thresholds are defined as a low timeout value, an average timeout value, and a high timeout value. When RSSI information is received, timeout values for the link can be assigned in view of the defined threshold values.

Step 402 updates the link timeout as a function of the received signal strength indication (RSSI). The step can be performed in any suitable way. For example, the step can be performed whenever a new frame is received over a particular link. Examples of how this can be done are provided above. In at least some embodiments, the updates can be computed taking into account path loss and RSSI information. Furthermore, while a particular formula is used above, it is to be appreciated and understood that other formulas can be used without departing from the spirit and scope of the claimed subject matter.

Reducing Route Discovery Overhead

In the embodiments about to be described, route discovery overhead can be reduced by using RSSI values to determine if route request packets (RREQs) should be dropped. In at least some embodiments, the best route request packets, as determined below, are forwarded to avoid unnecessary traffic at each intermediate node.

In one or more embodiments, RSSI values are used as a distance approximation between source and destination nodes for a particular frame. In practice, an RSSI threshold R0 is defined. In at least some embodiments, the threshold is defined to be close to the minimum possible RSSI value for a particular chip. Minimum values are typically given by a particular chip's specification. When a mesh node receives a RREQ frame, it compares the RSSI value with the defined threshold. If the received RSSI value is less than the threshold, the node discards the RREQ frame. By discarding the frame, the discarding node does not notify any link layers or any other entities. Otherwise, if the received RSSI value is greater than or equal to the threshold, the receiving node processes the RREQ frame according to underlying routing protocols.

Using the above-described approach can avoid weak links being discovered as part of the route discovery process. This is especially useful in the context of node mobility. Weak links can manifest in situations where source and destination nodes are located far away from one another. Specifically, if the source and destination nodes are far from one another, then the RSSI value will be correspondingly low and it is desirable to avoid these links. Implementation of this approach is desirable because of the low overhead associated with a comparison of RSSI values to defined threshold values. As an example of how one might implement the above-described approach, consider the following.

As noted above, the RSSI threshold R0 is set close to the minimum possible RSSI value for a particular chip, such as a WLAN chip. Assume at any particular instant of time, there are two moving nodes within communication range of each other with distance between them $d_t$. Assume also that the first node has transmitted a RREQ and the second node has received it. At this point of time, the receiver node compares the received RSSI value against R0. Suppose that this comparison finds the received RSSI value to be less than R0 and drops the packet. In the next time instant, one of the following three cases will occur assuming the distance between these two nodes is now $d_{t+1}$, where $\Delta = d_{t+1} - d_t$.

Case 1: $\Delta > 0$

In this case, the nodes are moving away from each other and therefore, the probability is high that they will soon move out of communication range with each other. In this case, subsequent RREQs are dropped and therefore, operation under the underlying protocol is provided.

Case 2: $\Delta < 0$

In this case, the two nodes are moving closer to each other and the received RREQ packet has already been dropped. In this case, however, the decision of dropping the packet was not optimal due to node mobility. However, this will not degrade the underlying protocol performance as long as the node which has originated the RREQ, receives a reply (RREP) from some other node. If the source of the RREQ, however, does not get any response for the RREQ previously sent, it will rebroadcast the RREQ and, as the nodes are now closer to each other, the received RREQ can be processed and not dropped by the original node that dropped the RREQ (subject of course to meeting the threshold condition).

Case 3: $\Delta = 0$

To handle this case, a list of RREQ packets that were dropped by the framework in the past is maintained. This list is searched and updated with the address of the RREQ sender node and broadcast ID of the RREQ. When a packet is dropped, it is entered into this list and in the future when a node receives the same RREQ that is present in this list, it will pass the received RREQ to the underlying protocol and delete the RREQ entry from dropped packet list. Dropped packet list entries should be kept for at least the time it takes a message to traverse the entire mesh network. This mechanism can ensure that in a case where a node accidentally dropped the RREQ packet, it should not repeat the same behavior in the future. Also, we assume here that the source node that has started route discovery shall retry route discovery until either a maximum attempt to route discovery is exhausted or a route reply is obtained.

FIG. 5 is a flow diagram that describes a method in accordance with one or more embodiments. The method can be implemented in connection with any suitable hardware, software, firmware, or combination thereof. In at least some embodiments, the method is implemented by individual nodes in a mesh network.

Step 500 defines an RSSI threshold. This step can be performed in any suitable way. Examples of how this can be performed are provided above. Step 502 receives an RREQ frame. Step 504 ascertains whether the received frame's RSSI is less than the threshold. If so, then step 506 discards the frame. If, on the other hand, the received frame's RSSI is not less than the defined threshold, step 508 processes the frame in accordance with underlying protocols.

In one or more embodiments, only the best RREQs can be forwarded by a particular node. In operation, each intermediate node, which is a node that is neither a source node nor a destination node, can immediately forward the first RREQ frame that is received for a given destination. The intermediate node can also start a timer for a given search time. When the timer is running, the intermediate node will continue to receive subsequent RREQs for the same destination node from other nodes. These are compared with the previously-forwarded RREQ. It does not, however, forward these subsequently-received RREQs during the timer interval. When the timer expires, the best RREQ of the subsequently-received RREQs is forwarded only if it is better (i.e. has a better metric) than the previously-received and forwarded RREQ. By "better metric" is meant the metric that is available through the standard. Specifically, each RREQ contains a path metric that gives the cost of traversing a path from source node to the node receiving this RREQ. Next, all of the RREQs that are received after the timer interval are dropped for the same route discovery session.

Thus, each node attempts to reduce broadcast traffic by forwarding only RREQs containing the best route for a given destination node. Additionally, since each intermediate node forwards the very first RREQ received for a given destination node, route discovery time is not affected.

FIG. 6 is a flow diagram that describes a method in accordance with one or more embodiments. The method can be implemented by any suitable hardware, software, firmware, or combination thereof. In at least some embodiments, the method can be implemented by a suitably configured node in a mesh network.

Step 600 receives an RREQ frame. Step 602 forwards the RREQ frame to one or more other nodes in the mesh network. Step 604 starts a timer for a given search time. This search time corresponds to the time that it typically takes to conduct route discovery for a particular RREQ. Step 606 receives one or more subsequent RREQ frames. Step 608 ascertains whether the timer has expired. If the timer has expired, then step 610 drops any received RREQ frames. If, on the other hand, step 608 ascertains that the timer has not expired, step 612 compares the received frame(s) with previously received RREQ frames. Step 614 ascertains whether the timer has expired. If the timer has not expired, then the method loops back to step 606 to receive subsequent RREQ frames. If, on the other hand, step 614 ascertains that the timer has expired, step 616 forwards the best RREQ frame.

Proactive Route Maintenance Based on Node's Battery

In one or more embodiments, proactive route maintenance can be performed based upon a node's battery life. That is, based upon a node's battery level, one or more route maintenance actions can be taken. For example, in at least some embodiments, a node's battery level can be used to ascertain whether route request packets or RREQs should be dropped. Alternately or additionally, in at least some other embodiments, a route error message or RERR packet is used to indicate whether a low battery node should no longer be on a particular route.

Dropping RREQs Responsive to Battery Level

In one or more embodiments, a threshold battery level can be defined and can then be used to ascertain whether route request packets (RREQs) received by a particular node should be dropped. Threshold values can be configurable and can vary from implementation to implementation. This approach helps to avoid low battery nodes in routes. Specifically, if a particular node has a low battery level and responsively drops any received route request packets, then that particular node will not be included in a particular route that can be selected in the mesh network.

Figure 7:
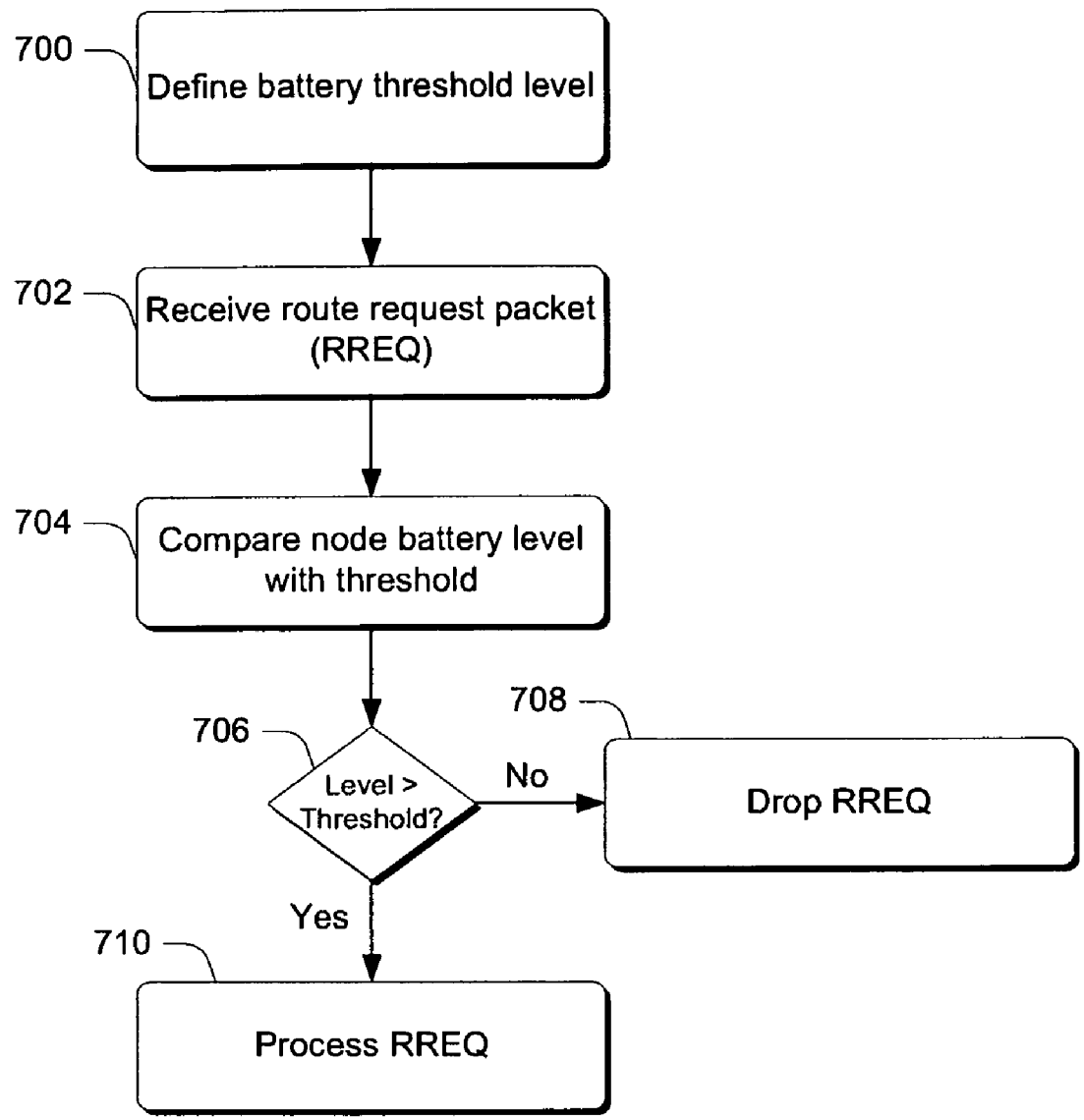
FIG. 7 is a flow diagram that describes steps a method in accordance with one or more embodiments.

FIG. 7 is a flow diagram that describes a method in accordance with one or more embodiments. The method can be implemented in connection with any suitable hardware, software, firmware, or combination thereof. In at least some embodiments, the method can be implemented by a suitably configured node in a mesh network.

Step 700 defines a battery threshold level. The step can be performed in any suitable way. In at least some embodiments, the battery threshold level is a configurable parameter that can vary between node implementations. Step 702 receives a route request packet (RREQ). This step can be performed in any suitable way. For example, typically during route discovery operations, route request packets are sent to various nodes in a mesh network. Step 704 compares a node's battery level with the defined threshold. If, at step 706, the node's battery level is less than the defined threshold, step 708 drops the route request packet. If, on the other hand, the node's battery level is greater than the defined threshold, step 710 processes the route request packet pursuant to normal protocol. In the illustrated and described embodiment, step 710 can be performed by operating the node in the usual way prescribed by the applicable standard which, in this case, is the IEEE 802.11s standard.

Sending RERRs Responsive to Battery Level

In at least some other embodiments, proactive route maintenance can be performed by sending a route error message or RERR when a node's remaining battery power falls below a certain threshold. In at least some embodiments, threshold levels are configurable in accordance with the system in which they are used.

In the IEEE 802.11s standard, a route error message or RERR is used to notify a sender that a particular link is no longer usable or reachable. This tells the sender to use some other route or to use route discovery. In at least some embodiments, in the event of a low battery condition, a low-battery node can send a RERR to notify the sender to use another node or conduct route discovery.

Typically, an RERR message is sent as follows. Assume there are three nodes, A, B, and C, and that node A sends a message to node B. If node C is unavailable, then node B would send an RERR message to node A informing node A that a link with node C is no longer available. In the illustrated and described embodiment, however, an RERR message can be used by a particular node to inform other nodes that it no longer wishes to be in a link. In this case, if node C had a low battery condition, it would send node B an RERR message to inform it that node C is unavailable. Alternatively or additionally, a node can forward RERR messages from other nodes responsive to low battery conditions at those other nodes. Upon receiving a RERR from another node, the nodes in a mesh network may then use alternate routes in their associated forwarding table to reach a particular destination or they can start route discovery if there is no such available route.

The above-described approach is particularly useful when a node is involved in more than one active route and is running low on battery power. Additionally, by informing other nodes to forward traffic in advance of a low battery condition, other nodes in a mesh network can avoid link failure detection.

In one implementation, an RERR packet may be piggybacked to a data packet or an acknowledgment packet in the mesh network. For example, if a node decides that it has a low battery condition and, correspondingly, wishes to send an RERR packet, it can start a timer and wait to see if it receives a packet that must be forwarded or sent during this time. If the node receives a packet that must be forwarded during this time, it can piggyback the RERR packet with this packet and cancel the timer.

However, in the event the timer expires without any such RERR propagation, the affected node can send an explicit RERR to the source or other nodes in an associated precursor list. In at least some embodiments, when there are nodes in the precursor list, the RERR can be sent as a broadcast packet containing the affected node's address as an unreachable destination. As will be appreciated by the skilled artisan, the broadcast packet is configured to be sent to multiple different nodes in the mesh network.

In accordance with the above-described embodiment, reductions in the number of stale route entries in forwarding tables can be achieved. Further, the above-described embodiment can proactively allow sources to choose another link from its route cache before the source discovers an actual link failure.

Figure 8:
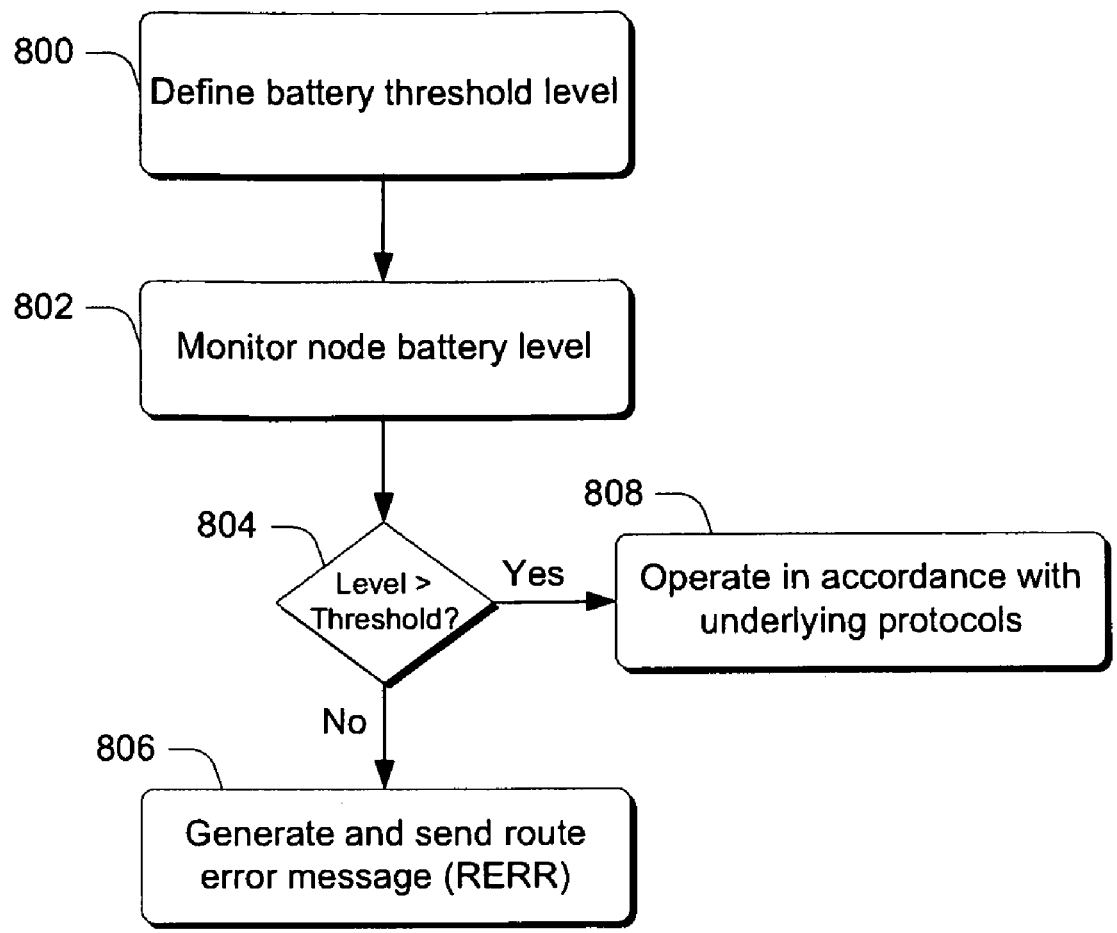
FIG. 8 is a flow diagram that describes steps a method in accordance with one or more embodiments.

FIG. 8 is a flow diagram that describes a method in accordance with one or more embodiments. The method can be implemented in accordance with any suitable hardware, software, firmware, or combination thereof. In at least some embodiments, the method can be implemented by a suitably-configured node in a mesh network.

Step 800 defines a battery threshold level. The step can be performed any suitable way. In at least some embodiments, battery threshold levels are configurable parameters that can vary between node implementations. Step 802 monitors a node's battery level. This step can be performed in any suitable way. For example, in at least some embodiments, a node can be configured to monitor its own battery level.

Step 804 ascertains whether a node's battery level is greater than the defined threshold. If the node's battery level is not greater than the defined threshold, step 806 generates and sends a route error message (RERR) indicating that this particular node does not wish to be a part of a link. In the illustrated and described embodiment, this step can be performed by the node whose battery level has dropped below the defined threshold. If, on the other hand, step 804 ascertains that the node's battery level is greater than the defined threshold, step 808 operates in accordance with underlying protocols. In the illustrated and described embodiment, step 808 can be performed by operating the node in the usual way prescribed by the applicable standard which, in this case, is the IEEE 802.11s standard.

Battery Aware Gossip Based Sleep Protocol

In one or more embodiments, a sleep protocol is provided to improve overall network life by allowing nodes in a mesh network to sleep for a random time with a given probability without informing neighboring nodes or making any control packet transmissions. Specifically, it has been determined that the battery life of a node can be improved by switching off its circuitry at regular intervals, thus allowing batteries to recover or recharge during sleep periods. This can improve overall network lifetime, while possibly incurring a slight increase in the average end-to-end delay and control overhead, due to an asynchronous sleep policy as described below.

In the illustrated and described embodiment, multiple nodes in a mesh network remain awake as long as they are running on battery power which is more than a predefined threshold, hereinafter referred to as the "LOW_BATTERY_THRESHOLD". When a node's battery level falls below the LOW_BATTERY_the node initiates a periodic probabilistic random sleep/awake cycle. A node which is running on battery power less than LOW_BATTERY_THRESHOLD is referred to as a low battery node. In one or more embodiments, a constant sleep probability "p" is defined such that:

$$0<p<1.$$

A low battery node that is idle, (e.g., a node in which no frame is in its interface queue for transmission or is currently not processing any received frame) selects a random time to sleep with probability "p" or to stay awake with probability (1−p). The probability "p" is a configurable parameter and can depend on how many nodes are in a particular mesh network. For example, if there are more nodes in a mesh network, then probability "p" can have a higher value than if the mesh network contains a smaller number of nodes. Thus, if the node density is very large, and if some nodes are sleeping, then other nodes will be able to forward traffic to remaining nodes in the network. In the illustrated and described embodiment, the sleep time or period of a low battery node is proportional to:

$$A\times(\text{LOW\_BATTERY\_}-\text{Node's remaining battery power}),$$

where "A" is a configurable constant.

In at least some embodiments, all nodes decide their own sleep time and sleep duration independently of other nodes. In addition, nodes do not send any control packets to neighboring nodes when they decide to enter a sleep mode.

In one or more embodiments, a sleep/awake operation can have the following properties. At the beginning of a time period, each low battery node chooses either to go to sleep with probability "p" or stay awake with probability 1−p for this period. Further, the sleep period of a node is proportional to (LOW_BATTERY_THRESHOLD−Node's remaining battery power). In addition, all sleeping nodes wake up at the end of each period. Further, all low battery nodes repeat the above process for every period.

In addition, in one or more embodiments, a node that is a source or sink of a communication always remains awake irrespective of its remaining battery level. As will be appreciated by the skilled artisan, this scheme does not require any exchange of topological information from other nodes in the mesh network. Therefore, it may increase average end-to-end delay and can also affect packet delivery ratios. This is because if a node decides to forward a packet to a node that has gone to sleep, it may have to perform route discovery to find another route. The packet delivery ratio is the total number of packets received by the destination node divided by the total number of packets sent by the source node. Because a node does not notify its neighbor nodes when it goes to sleep, in some instances, its neighbor node may still try to transmit packets to the sleeping node. This will cause the number of transmissions to be more than the number of transmissions that are received. However, for mesh networks that are sufficiently dense, there should always be more than one path between any two nodes.

Figure 9:
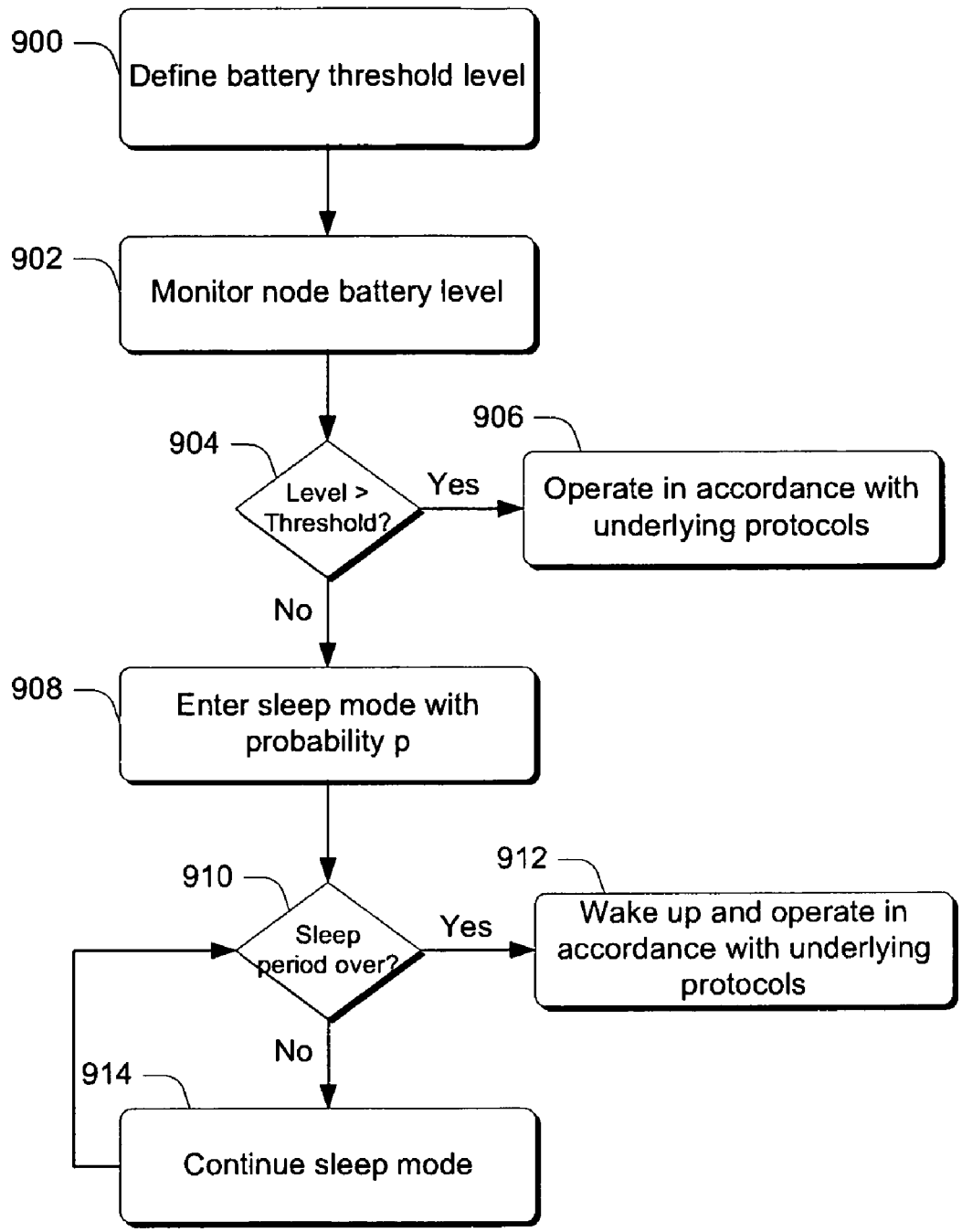
FIG. 9 is a flow diagram that describes steps a method in accordance with one or more embodiments.

FIG. 9 is a flow diagram that describes a method in accordance with one or more embodiments. The method can be implemented in connection with any suitable hardware, software, firmware, or combination thereof. In at least some embodiments, the method can be implemented by a suitably configured node in a mesh network.

Step 900 defines a battery threshold level. This step can be performed in any suitable way. For example, individual nodes can define their own battery threshold levels in connection with the specific hardware embodied by the node. Step 902 monitors a node's battery level. This step can be performed by the node itself. Step 904 ascertains whether a node's battery level is greater than the defined threshold level. If a node's battery level is greater than the defined threshold level, then step 906 operates in accordance with underlying protocols. Here, a node would simply continue to operate in the standard way. If, on the other hand, step 904 ascertains that the node's battery level is not greater than the defined threshold level, step 908 enters a sleep mode with a probability "p".

Step 910 ascertains whether an associated sleep period is over. If the associated sleep period is over, step 912 wakes up the node and operates the node in accordance with underlying protocols. If, on the other hand, step 910 ascertains that the sleep period is not over, step 914 continues the sleep mode and the method branches back to step 910.

Having discussed various embodiments in which mesh network operations can be improved, consider now a discussion of some example node environments which provide illustrations of devices that can serve as nodes in a mesh network. It is to be appreciated and understood, however, that the description provided just below is provided as an example only. Accordingly, other nodes that are implemented by other types of devices can be used without departing from the spirit and scope of the claimed subject matter.

Example Node Environments

Referring now to FIGS. 10-15, various example implementations of node environments are shown. The various node environments can utilize the techniques described above.

Figure 10:
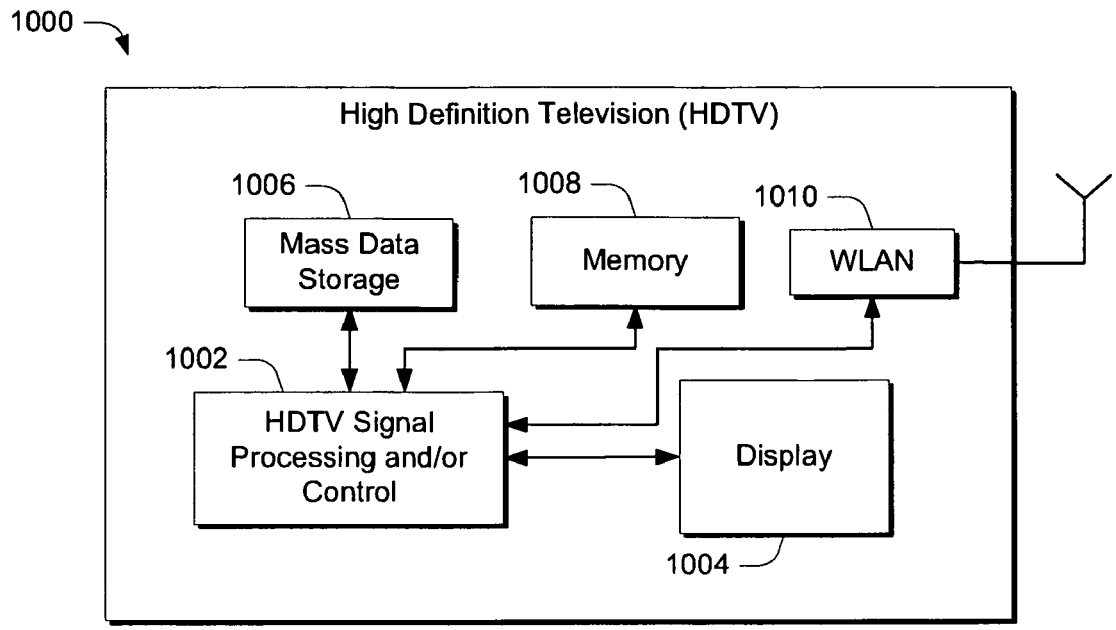
FIGS. 10-15 illustrate example node devices in accordance with one or more embodiments.

Referring now to FIG. 10, a node device may be embodied in a high definition television (HDTV) 1000 and may be implemented in either or both signal processing and/or control circuits, which are generally identified at 1002, a wireless local area network (WLAN) interface 1010 and/or mass data storage 1006 of the HDTV 1000. HDTV 1000 receives HDTV input signals in either a wired or wireless format and generates HDTV output signals for a display 1004. In some implementations, signal processing circuit and/or control circuit 1002 and/or other circuits (not shown) of HDTV 1000 may process data, perform coding, decoding and/or encryption, perform calculations, format data, and/or perform any other type of HDTV processing that may be required.

HDTV 1000 may include mass data storage 1006, which stores data in a nonvolatile manner such as optical and/or magnetic storage devices. The magnetic storage device may be a mini HDD that includes one or more platters having a diameter that is smaller than approximately 1.8". HDTV 1000 may also include memory 1008 such as RAM, ROM, low latency nonvolatile memory such as flash memory and/or other suitable electronic data storage. HDTV 1000 also may support connections with a WLAN via a WLAN network interface 1010.

Figure 11:
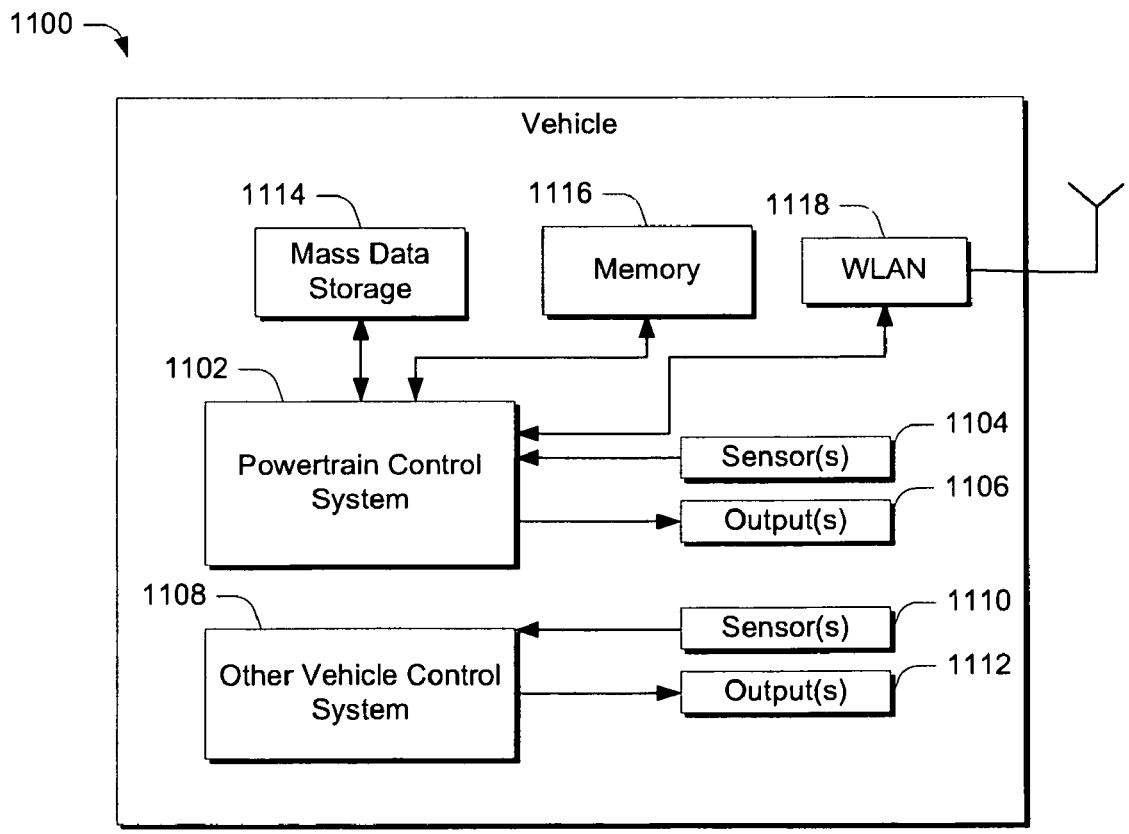

Referring now to FIG. 11, a node device may be implemented as part of a communication system of a vehicle 1100, a WLAN interface 1118 and/or mass data storage 1114 of the vehicle control system. In some implementations, a powertrain control system 1102 receives inputs from one or more sensors 1104 such as temperature sensors, pressure sensors, rotational sensors, airflow sensors, and/or any other suitable sensors that generate one or more output control signals 1106, such as engine operating parameters, transmission operating parameters, and/or other control signals.

A node device can be embodied in other control systems 1108 of vehicle 1100. Control system 1108 may likewise receive signals from input sensors 1110 and/or output control signals 1112 to one or more output devices. In some implementations, control system 1108 may be part of an anti-lock braking system (ABS), a navigation system, a telematics system, a vehicle telematics system, a lane departure system, an adaptive cruise control system, a vehicle entertainment system such as a stereo, DVD, compact disc, and the like. Still other implementations are contemplated.

Powertrain control system 1102 may include mass data storage 1114 that stores data in a nonvolatile manner. Mass data storage 1114 may include optical and/or magnetic storage devices for example hard disk drives HDD and/or DVDs. The magnetic storage device may be a mini HDD that includes one or more platters having a diameter that is smaller than approximately 1.8". Powertrain control system 1102 may be connected to memory 1116 such as RAM, ROM, low latency nonvolatile memory such as flash memory, and/or other suitable electronic data storage. Powertrain control system 1102 also may support connections with a WLAN via a WLAN network interface 1118. The control system 1108 may also include mass data storage, memory, and/or a WLAN interface (all not shown).

Figure 12:
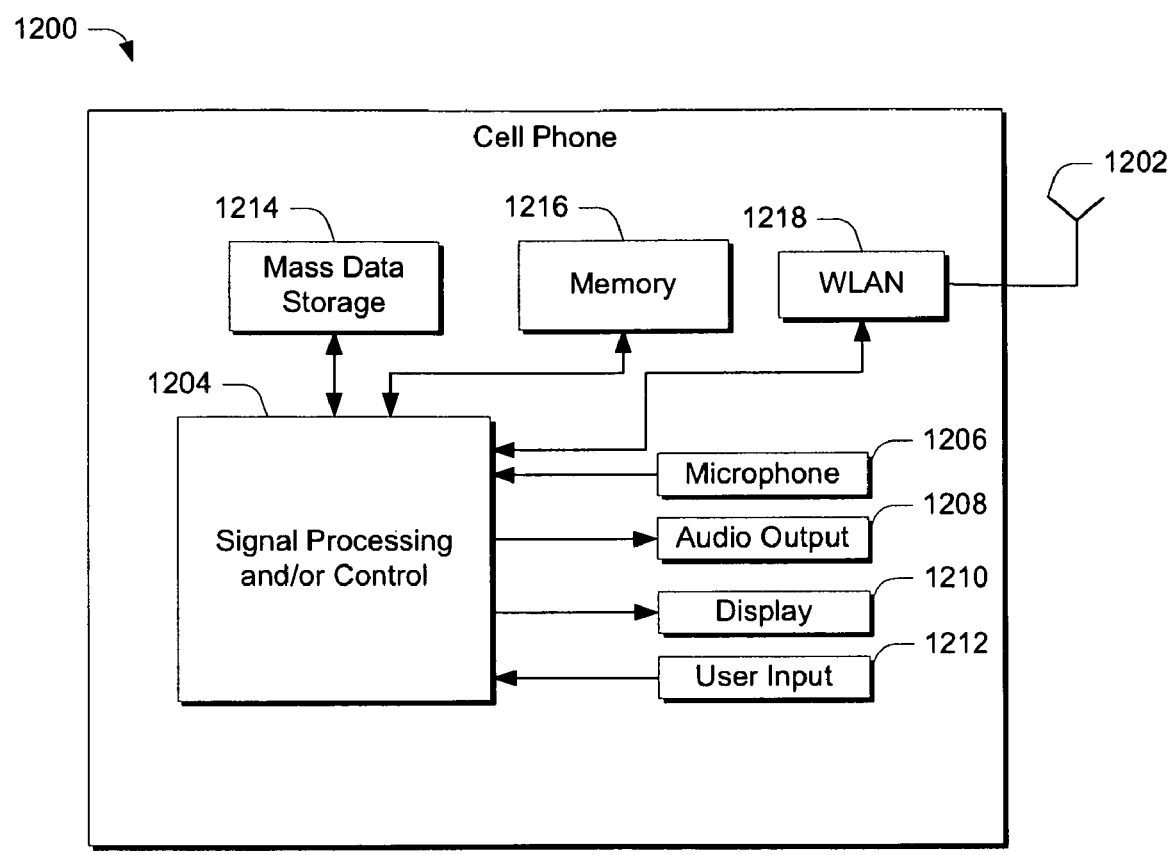

Referring now to FIG. 12, the node device may be embodied in a cellular phone 1200 that may include a cellular antenna 1202. The node device may be implemented in connection with either or both signal processing and/or control circuits, which are generally identified at 1204, a WLAN interface 1218, and/or mass data storage of the cellular phone 1200. In some implementations, cellular phone 1200 includes a microphone 1206, an audio output 1208 such as a speaker and/or audio output jack, a display 1210 and/or an input device 1212 such as a keypad, pointing device, voice actuation, and/or other input device. Signal processing and/or control circuits 1204 and/or other circuits (not shown) in cellular phone 1200 may process data, perform coding, decoding and/or encryption, perform calculations, format data, and/or perform other cellular phone functions.

Cellular phone 1200 may include mass data storage 1214, which stores data in a nonvolatile manner such as optical and/or magnetic storage devices for example hard disk drives HDD and/or DVDs. The magnetic storage device may be a mini HDD that includes one or more platters having a diameter that is smaller than approximately 1.8". Cellular phone 1200 may be connected to memory 1216 such as RAM, ROM, low latency nonvolatile memory such as flash memory, and/or other suitable electronic data storage. Cellular phone 1200 also may support connections with a WLAN via a WLAN network interface 1218.

Figure 13:
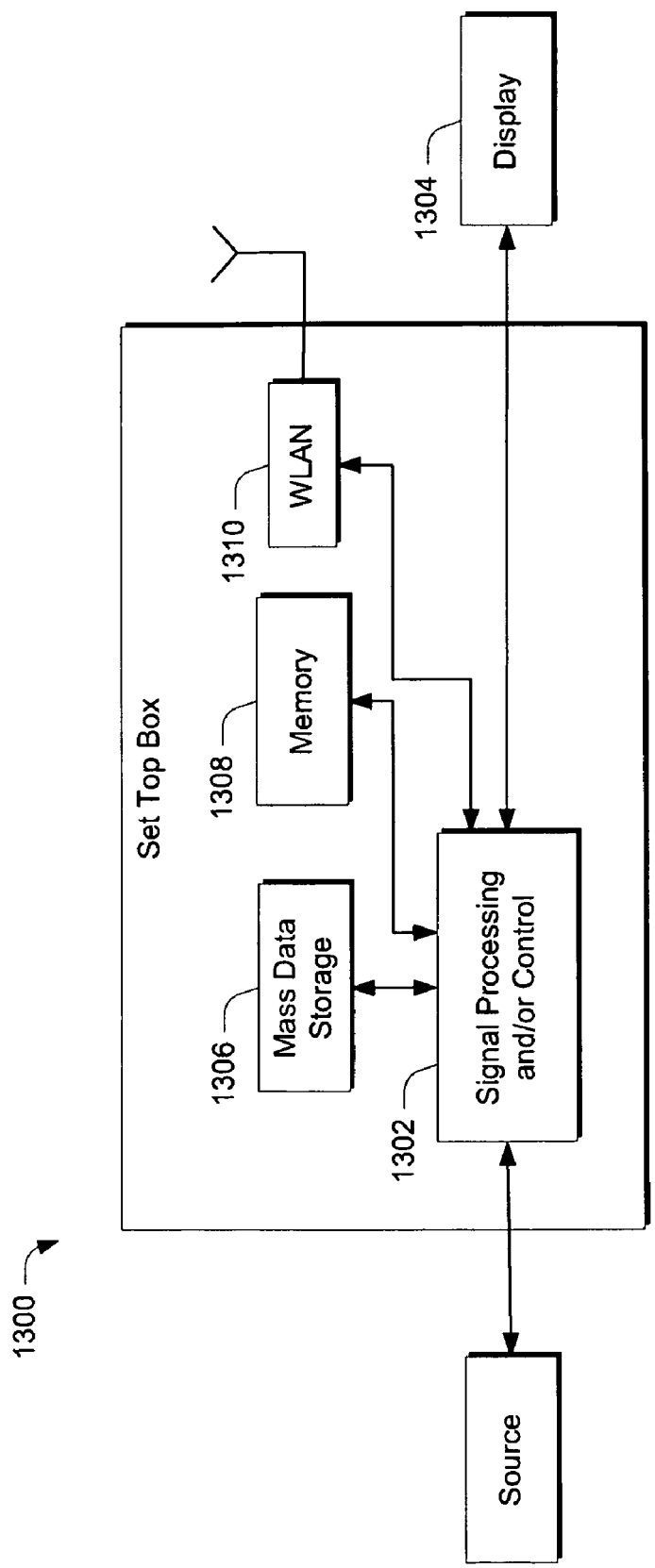

Referring now to FIG. 13, a node device may be embodied in a set top box 1300, which may be implemented by either or both signal processing and/or control circuits, which are generally identified at 1302, a WLAN interface 1310, and/or mass data storage 1306 of the set top box 1300. Set top box 1300 receives signals from a source such as a broadband source and outputs standard and/or high definition audio/video signals suitable for a display 1304 such as a television and/or monitor and/or other video and/or audio output devices. Signal processing and/or control circuits 1302 and/or other circuits (not shown) of the set top box 1300 may process data, perform coding, decoding and/or encryption, perform calculations, format data, and/or perform any other set top box function.

Set top box 1300 may include a mass data storage 1306 that stores data in a nonvolatile manner. Mass data storage 1306 may include optical and/or magnetic storage devices for example hard disk drives HDD and/or DVDs. The magnetic storage device may be a mini HDD that includes one or more platters having a diameter that is smaller than approximately 1.8". Set top box 1300 may be connected to memory 1308 such as RAM, ROM, low latency nonvolatile memory such as flash memory and/or other suitable electronic data storage. Set top box 1300 also may support connections with a WLAN via a WLAN network interface 1310.

Figure 14:
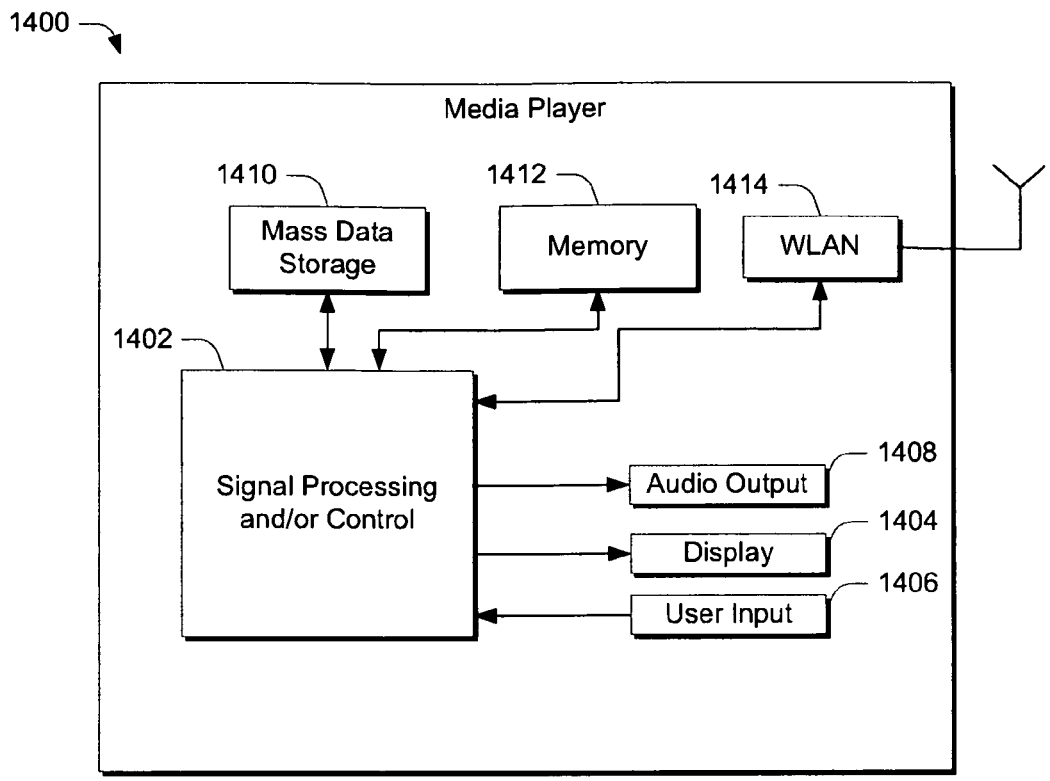

Referring now to FIG. 14, a node device may be embodied in a media player 1400 and may be implemented in connection with either or both signal processing and/or control circuits, which are generally identified at 1402, a WLAN interface 1414, and/or mass data storage 1410 of the media player 1400. In some implementations, media player 1400 includes a display 1404 and/or a user input 1406 such as a keypad, touchpad, and the like. In some implementations, media player 1400 may employ a graphical user interface (GUI) that typically employs menus, drop down menus, icons, and/or a point-and-click interface via display 1404 and/or user input 1406. Media player 1400 further includes an audio output 1408 such as a speaker and/or audio output jack. Signal processing and/or control circuits 1402 and/or other circuits (not shown) of media player 1400 may process data, perform coding, decoding and/or encryption, perform calculations, format data, and/or perform any other media player function.

Media player 1400 may include mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The magnetic storage device may be a mini HDD that includes one or more platters having a diameter that is smaller than approximately 1.8". Media player 1400 may be connected to memory 1412 such as RAM, ROM, low latency nonvolatile memory such as flash memory, and/or other suitable electronic data storage. Media player 1400 also may support connections with a WLAN via a WLAN network interface 1414.

Figure 15:
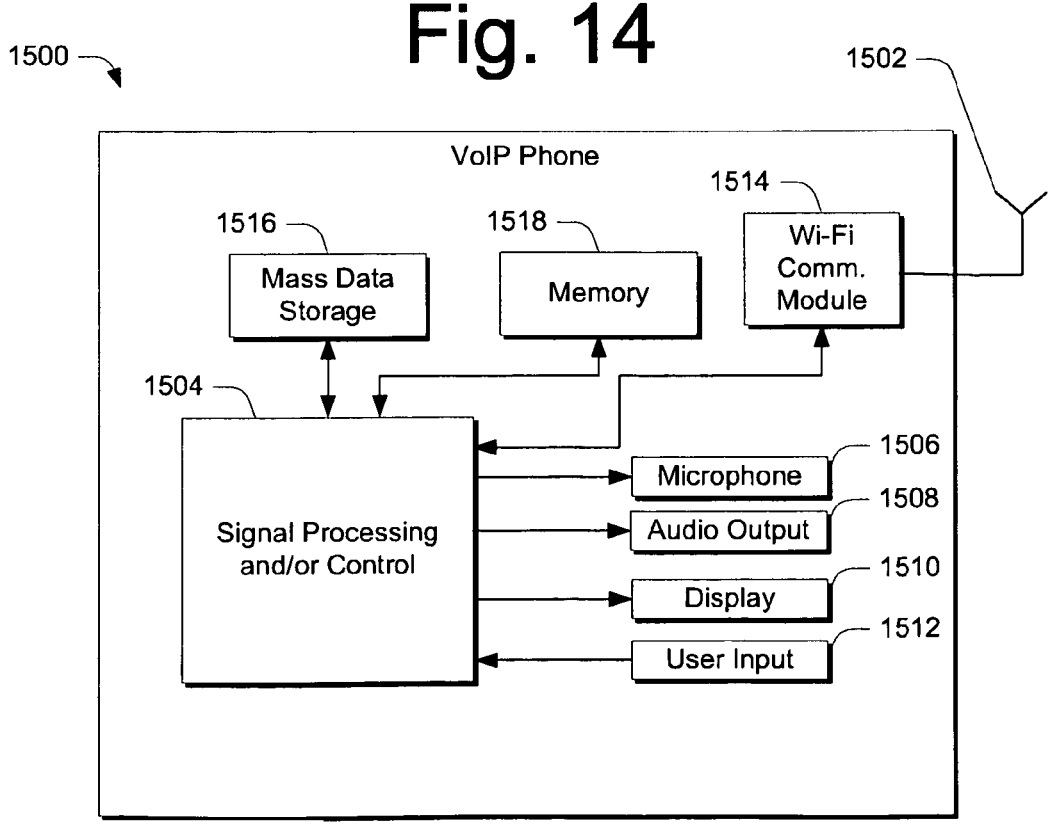

Referring to FIG. 15, a node device may be embodied in connection with a Voice over Internet Protocol (VoIP) phone 1500 that may include an antenna 1502 or, alternately or additionally, in connection with a VoIP box that enables a conventional telephone to be plugged in and utilized with VoIP technology. The node device may be implemented in connection with either or both signal processing and/or control circuits, which are generally identified at 1504, a wireless interface 1514, and/or mass data storage 1516 of the VoIP phone 1500. In some implementations, VoIP phone 1500 includes, in part, a microphone 1506, an audio output 1508 such as a speaker and/or audio output jack, a display monitor 1510, an input device 1512 such as a keypad, pointing device, voice actuation, and/or other input devices, and a Wireless Fidelity (Wi-Fi) communication module 1514. Signal processing and/or control circuits 1504 and/or other circuits (not shown) in VoIP phone 1500 may process data, perform coding, decoding and/or encryption, perform calculations, format data, and/or perform other VoIP phone functions.

VoIP phone 1500 may include mass data storage 1516 that stores data in a nonvolatile manner such as optical and/or magnetic storage devices, for example hard disk drives HDD and/or DVDs. The magnetic storage device may be a mini HDD that includes one or more platters having a diameter that is smaller than approximately 1.8". VoIP phone 1700 may be connected to memory 1518, which may be a RAM, ROM, low latency nonvolatile memory such as flash memory, and/or other suitable electronic data storage. VoIP phone 1500 is configured to establish communications link with a VoIP network (not shown) via Wi-Fi communication module 1514. Still other implementations in addition to those described above are contemplated.

CONCLUSION

Various embodiments provide improved mesh networks with properties that address various shortcomings of current mesh network implementations. At least some embodiments are directed to improving operations of mesh networks in connection with battery powered devices and address concerns associated with latency issues due to power save nodes as well as load balancing. Yet other embodiments address route cache timeouts, reduce route discovery overhead, perform proactive route maintenance based on a node's battery, and provide a straightforward battery-aware process based sleep protocol.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
defining a received signal strength indication (RSSI) threshold in a mesh network;
receiving a route request (RREQ) frame;
ascertaining whether an RSSI associated with the RREQ frame is less than the RSSI threshold;
discarding the received RREQ frame if the RREQ frame's RSSI is less than the RSSI threshold;
processing the received RREQ frame if the RREQ frame's RSSI is not less than the RSSI threshold;
responsive to discarding the received RREQ frame, entering information associated with the discarded RREQ frame in a list;
receiving a same RREQ frame; and
forwarding the same RREQ frame to one or more nodes in the mesh network.

2. The method of claim 1, wherein entries in the list are expired after a fixed time that is equal to the time it takes an RREQ frame to traverse the mesh network.

3. A method comprising:
defining a received signal strength indication (RSSI) threshold in a mesh network;
receiving a route request (RREQ) frame;
ascertaining whether an RSSI associated with the RREQ frame is less than the RSSI threshold;
discarding the received RREQ frame if the RREQ frame's RSSI is less than the RSSI threshold;
processing the received RREQ frame if the RREQ frame's RSSI is not less than the RSSI threshold;
receiving another RREQ frame;
forwarding said another RREQ frame to one or more other nodes in the mesh network;
starting a timer for a given search time;
receiving one or more subsequent RREQ frames;
ascertaining whether the timer has expired;
dropping subsequently received RREQ frames if the timer has expired;
if the timer has not expired, comparing the received subsequent RREQ frames with a previously received RREQ frame; and
if the timer has expired, forwarding one of the received subsequent RREQ frames.

4. The method of claim 3, wherein said forwarding one of the received subsequent RREQ frames comprises forwarding a best RREQ frame.

5. The method of claim 3, wherein the search time corresponds to a time that it takes to conduct route discovery for a particular RREQ.

6. The method of claim 1, wherein the mesh network is compliant with the IEEE 802.11s standard.

7. The method of claim 1, further comprising, prior to processing the received RREQ frame if the RREQ frame's RSSI is not less than the RSSI threshold, discarding the received RREQ frame based on a signal-to-noise ratio (SNR) associated with the RREQ frame.

8. The method of claim 1, further comprising, prior to processing the received RREQ frame if the RREQ frame's RSSI is not less than the RSSI threshold, discarding the received RREQ frame based on a battery level of a node of the mesh network from which the RREQ frame is received.

9. A node device of a mesh network comprising a control processor and a wireless local area network (WLAN) transceiver operative to:
- define a received signal strength indication (RSSI) threshold in the mesh network;
- receive, through the WLAN transceiver, a route request (RREQ) frame;
- ascertain whether an RSSI associated with the RREQ frame is less than the RSSI threshold;
- discard the received RREQ frame if the RREQ frame's RSSI is less than the RSSI threshold;
- process the received RREQ frame if the RREQ frame's RSSI is not less than the RSSI threshold;
- responsive to the discard of the received RREQ frame, enter through the signal-processing or control circuits, information associated with the discarded RREQ frame in a list;
- receive, through the WLAN transceiver, a same RREQ frame; and
- forward, through the WLAN transceiver, the same RREQ frame to one or more nodes in the mesh network.

10. The node device of claim 9, wherein entries in the list are expired after a fixed time that is equal to the time it takes an RREQ frame to traverse the mesh network.

11. A node device of a mesh network comprising a control processor and a wireless local area network (WLAN) transceiver operative to:
- define a received signal strength indication (RSSI) threshold in the mesh network;
- receive, through the WLAN transceiver, a route request (RREQ) frame;
- ascertain whether an RSSI associated with the RREQ frame is less than the RSSI threshold;
- discard the received RREQ frame if the RREQ frame's RSSI is less than the RSSI threshold;
- process the received RREQ frame if the RREQ frame's RSSI is not less than the RSSI threshold;
- receive, through the WLAN transceiver, another RREQ frame;
- forward, through the WLAN transceiver, said another RREQ frame to one or more other nodes in the mesh network;
- start a timer for a given search time;
- receive, through the WLAN transceiver, one or more subsequent RREQ frames;
- ascertain whether the timer has expired;
- drop subsequently received RREQ frames if the timer has expired;
- if the timer has not expired, compare the received subsequent RREQ frames with a previously received RREQ frame; and if the timer has expired, forward, through the WLAN transceiver, one of the received subsequent RREQ frames.

12. The node device of claim 1, wherein said the operation of forwarding, the one of the received subsequent RREQ frames forwards a best RREQ frame.

13. The node device of claim 11, wherein the search time corresponds to a time that it takes to conduct route discovery for a particular RREQ.

14. The node device of claim 9, the control processor further operative to, prior to process the received RREQ frame if the RREQ frame's RSSI is not less than the RSSI threshold, discard the received RREQ frame based on a signal-to-noise ratio (SNR) associated with the RREQ frame.

15. The node device of claim 9, the control processor further operative to, prior to process the received RREQ frame if the RREQ frame's RSSI is not less than the RSSI threshold, discard the received RREQ frame based on a battery level of a node of the wireless mesh network from which the RREQ frame is received.

16. One or more non-transitory computer-readable media having computer-executable instructions thereon, that, when executed by one or more processors, cause a communication module to:
- define a received signal strength indication (RSSI) threshold in a mesh network;
- receive a route request (RREQ) frame;
- ascertain whether an RSSI associated with the RREQ frame is less than the RSSI threshold;
- discard the received RREQ frame if the RREQ frame's RSSI is less than the RSSI threshold; and
- process the received RREQ frame if the RREQ frame's RSSI is not less than the RSSI threshold;
- responsive to discarding the received RREQ frame, enter information associated with the discarded RREQ frame in a list;
- receive a same RREQ frame; and
- forward the same RREQ frame to one or more nodes in the mesh network.

17. The media of claim 16, wherein entries in the list are expired after a fixed time that is equal to the time it takes an RREQ frame to traverse the mesh network.

18. The media of claim 17, wherein the instructions are further executable to cause the communication module to:
- receive another RREQ frame;
- forward said another RREQ frame to one or more other nodes in the mesh network;
- start a timer for a given search time;
- receive one or more subsequent RREQ frames;
- ascertain whether the timer has expired;
- drop subsequently received RREQ frames if the timer has expired;
- if the timer has not expired, compare the received subsequent RREQ frames with a previously received RREQ frame; and
- if the timer has expired, forward one of the received subsequent RREQ frames.

19. The media of claim 18, wherein said forwarding one of the received subsequent RREQ frames comprises forwarding a best RREQ frame.

20. The media of claim 18, wherein the search time corresponds to a time that it takes to conduct route discovery for a particular RREQ.

21. The media of claim 16, wherein the instructions are further executable to cause the communication module to, prior to processing the received RREQ frame if the RREQ frame's RSSI is not less than the RSSI threshold, discard the received RREQ frame based on a signal-to-noise ratio (SNR) associated with the RREQ frame.

22. The media of claim 16, wherein the instructions are further executable to cause the communication module to, prior to processing the received RREQ frame if the RREQ frame's RSSI is not less than the RSSI threshold, discard the received RREQ frame based on a battery level of a node of the wireless mesh network from which the RREQ frame is received.

23. The method of claim 3, wherein the mesh network is compliant with the IEEE 802.11s standard.

24. The method of claim 3, further comprising, prior to processing the received RREQ frame if the RREQ frame's RSSI is not less than the RSSI threshold, discarding the received RREQ frame based on a signal-to-noise ratio (SNR) associated with the RREQ frame.

25. The method of claim 1, further comprising, prior to processing the received RREQ frame if the RREQ frame's RSSI is not less than the RSSI threshold, discarding the received RREQ frame based on a battery level of a node of the mesh network from which the RREQ frame is received.

26. The node device of claim 11, the control processor further operative to, prior to process the received RREQ frame if the RREQ frame's RSSI is not less than the RSSI threshold, discard the received RREQ frame based on a signal-to-noise ratio (SNR) associated with the RREQ frame.

27. The node device of claim 1, the control processor further operative to, prior to process the received RREQ frame if the RREQ frame's RSSI is not less than the RSSI threshold, discard the received RREQ frame based on a battery level of a node of the wireless mesh network from which the RREQ frame is received.

* * * * *